US010889366B2

(12) United States Patent
Jarrett et al.

(10) Patent No.: US 10,889,366 B2
(45) Date of Patent: Jan. 12, 2021

(54) DUCTED THRUSTERS

(71) Applicant: Bell Helicopter Textron Inc., Fort Worth, TX (US)

(72) Inventors: Chad Lewis Jarrett, Grand Prairie, TX (US); Frank Bradley Stamps, Colleyville, TX (US); Daniel Bryan Robertson, Southlake, TX (US); Kirk Landon Groninga, Keller, TX (US); Matthew Edward Louis, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 319 days.

(21) Appl. No.: 16/138,672

(22) Filed: Sep. 21, 2018

(65) Prior Publication Data

US 2020/0094942 A1    Mar. 26, 2020

(51) Int. Cl.
*F04D 29/32* (2006.01)
*B64C 11/00* (2006.01)
*B64C 29/00* (2006.01)
*B64C 27/26* (2006.01)
*B64C 11/06* (2006.01)
*B64C 27/20* (2006.01)

(52) U.S. Cl.
CPC ............ *B64C 11/001* (2013.01); *B64C 11/06* (2013.01); *B64C 27/20* (2013.01); *B64C 27/26* (2013.01); *B64C 29/0033* (2013.01); *F04D 29/328* (2013.01)

(58) Field of Classification Search
CPC ..... B64C 11/001; B64C 11/008; B64C 11/06; F04D 29/328
See application file for complete search history.

(56) References Cited

U.S. PATENT DOCUMENTS

| 3,594,097 | A |   | 7/1971  | Mouille           |
|-----------|---|---|---------|-------------------|
| 4,585,391 | A |   | 4/1986  | Vuillet et al.    |
| 4,626,172 | A |   | 12/1986 | Mouille et al.    |
| 4,809,931 | A |   | 3/1989  | Mouille et al.    |
| 4,883,240 | A | * | 11/1989 | Adamson ................ B64C 11/00 244/69 |
| 5,066,195 | A |   | 11/1991 | Dobrzynski        |
| 5,131,604 | A |   | 7/1992  | Yoerkie, Jr. et al. |
| 5,306,119 | A |   | 4/1994  | Bandoh et al.     |

(Continued)

OTHER PUBLICATIONS

Ewald, Donald, et al.; Noise Reduction by Applying Modulation Principles; The Journal of the Accoustical Society of America, vol. 49, No. 5 (part 1); 1971; pp. 1381-1385.

*Primary Examiner* — Brian M O'Hara
(74) *Attorney, Agent, or Firm* — Lightfoot & Alford PLLC

(57) ABSTRACT

An aircraft comprising a pair of ducted thrusters. Each of the ducted thrusters comprises a duct surrounding a rotor assembly with a rotor hub having a plurality of rotor blades extending therefrom, wherein the plurality of rotor blades have a modulated angular distribution about a central longitudinal axis of the duct. Each of the ducted thrusters further comprises a stator assembly having a stator hub with a plurality of stator vanes extending from the stator hub to an interior surface of the duct, wherein each of the plurality of the stator vanes are angularly modulated around the stator hub such that angular spacing between pairs of adjacent vanes of the plurality of stator vanes varies for each pair of the adjacent vanes.

20 Claims, 25 Drawing Sheets

(56) References Cited

U.S. PATENT DOCUMENTS

| | | | |
|---|---|---|---|
| 5,454,691 A | 10/1995 | Henri et al. | |
| 5,498,129 A | 3/1996 | Dequin et al. | |
| 5,566,907 A * | 10/1996 | Marze | B64C 27/82 244/1 N |
| 5,588,618 A * | 12/1996 | Marze | B64C 27/82 244/17.19 |
| 5,605,440 A | 2/1997 | Bocoviz et al. | |
| 5,634,611 A | 6/1997 | Marze et al. | |
| 7,959,105 B2 | 6/2011 | Marze | |
| 8,061,962 B2 | 11/2011 | Marze | |
| 8,286,908 B2 | 10/2012 | Kebrle et al. | |
| 8,500,062 B2 | 8/2013 | Brunken, Jr. | |
| 8,967,525 B2 * | 3/2015 | Schneider | B64C 27/82 244/17.21 |
| 10,443,626 B2 * | 10/2019 | Mielke | F04D 29/542 |
| 2018/0372120 A1 * | 12/2018 | Moser | F04D 19/002 |

* cited by examiner

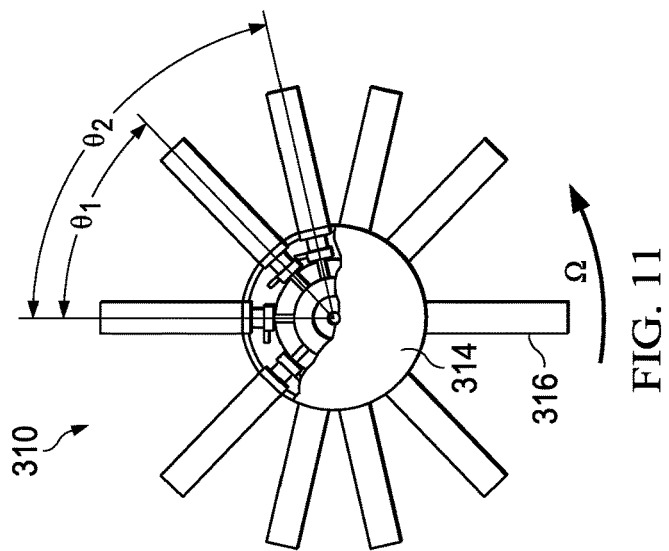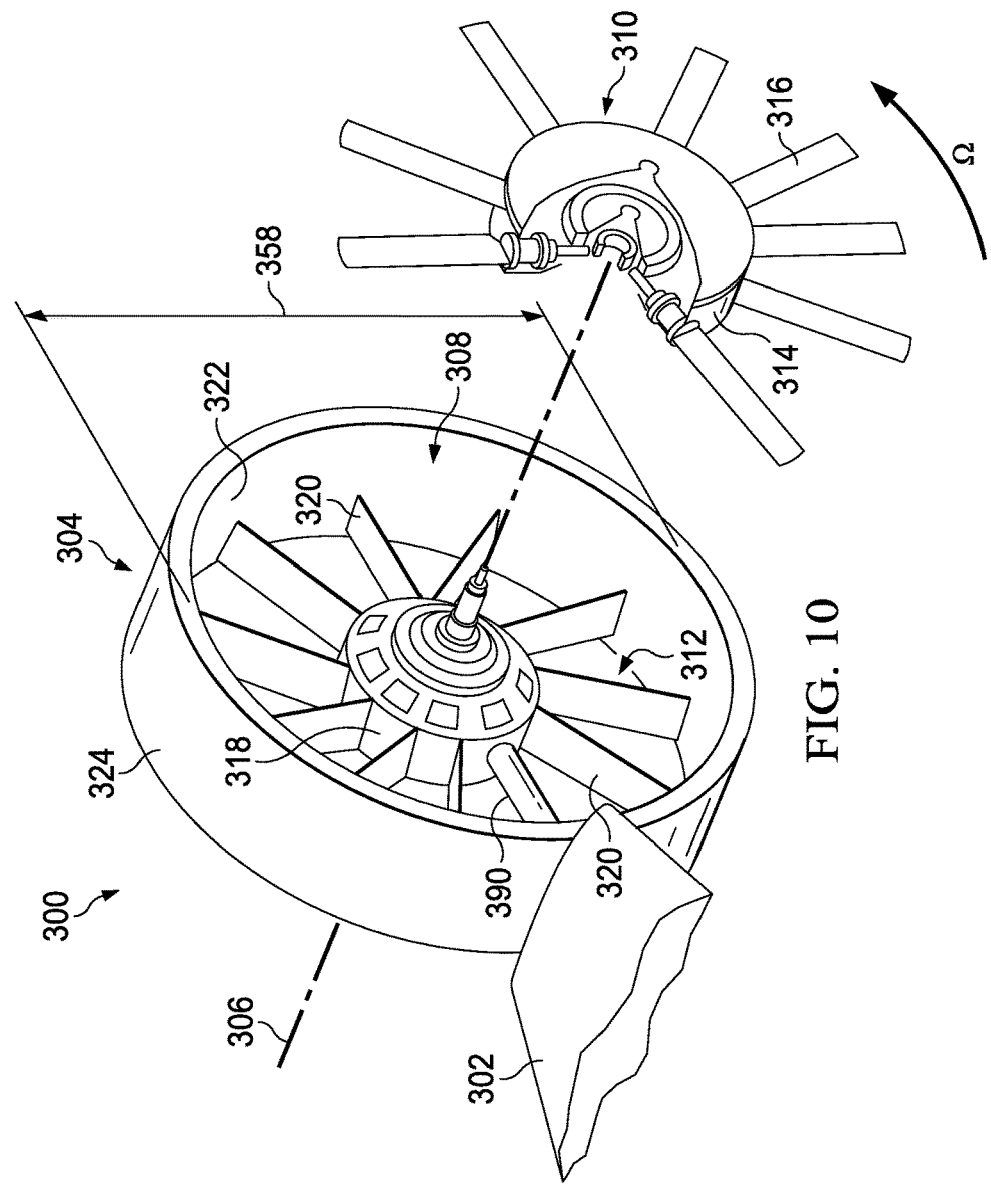

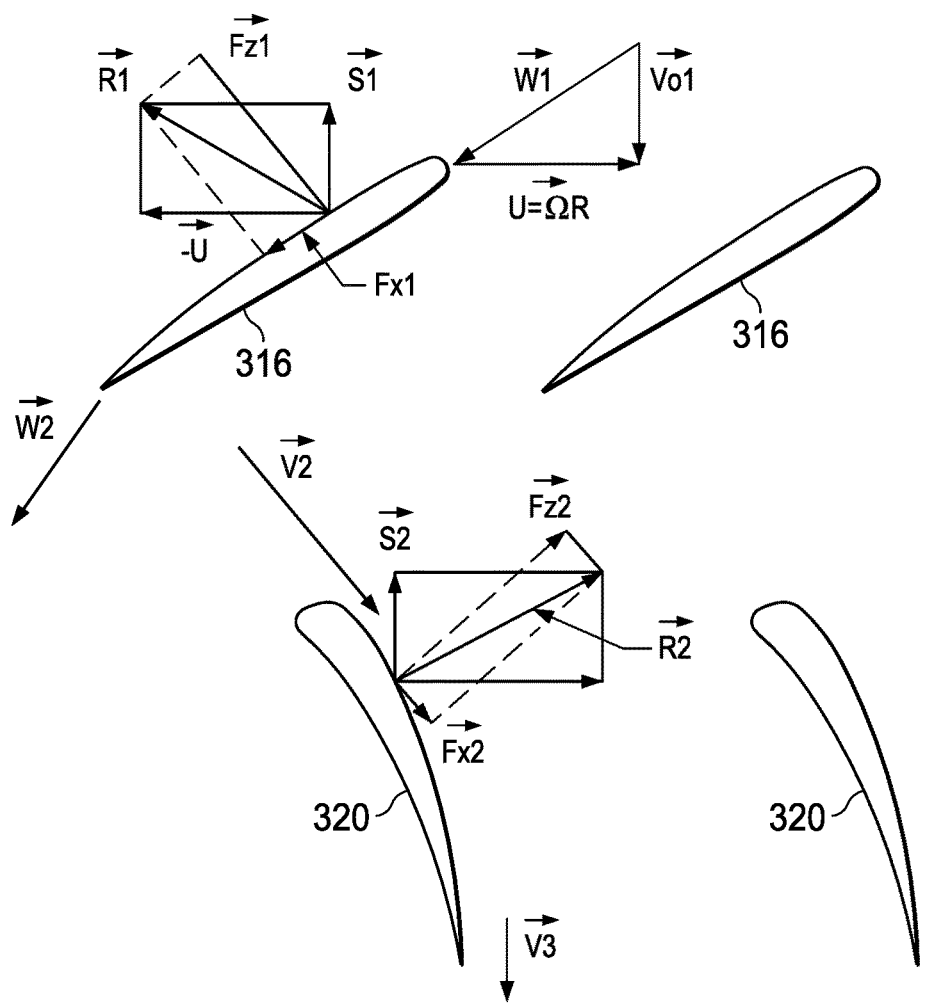
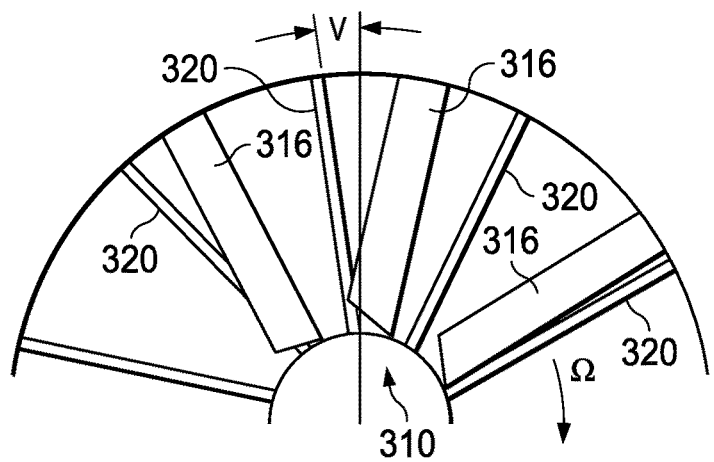
FIG. 12
FIG. 13

| BLADE NUMBER | NOMINAL (DEGREES) | SINUSOIDAL LAW (m=2) (DEGREES) | BELL MODIFIED SINUSOIDAL LAW (m=1) (DEGREES) |
|---|---|---|---|
| 1 | 40.00 | 49.400 | 44.76 |
| 2 | 40.00 | 33.865 | 40.68 |
| 3 | 40.00 | 28.464 | 41.57 |
| 4 | 40.00 | 42.136 | 34.80 |
| 5 | 40.00 | 52.270 | 33.00 |
| 6 | 40.00 | 42.136 | 58.37 |
| 7 | 40.00 | 28.464 | 30.75 |
| 8 | 40.00 | 33.865 | 37.15 |
| 9 | 40.00 | 49.400 | 38.92 |

FIG. 20

DUCTED THRUSTERS

BACKGROUND

Ducted main rotors are rarely used on helicopters because helicopter rotors are very large and would require an enormous, and therefore heavy, duct. In addition, there is no straightforward way to attach a duct around the main rotor on a helicopter. However, in U.S. patent application Ser. No. 15/477,582, filed on Apr. 3, 2017, which is incorporated herein by reference in its entirety, a helicopter with a non-ducted main rotor and ducted forward-facing thrusters is disclosed. Tiltrotor aircraft rely on smaller diameter, highly loaded rotors that are more amenable to utilizing a duct. Tiltrotor aircraft generally have two proprotors positioned at the ends of a fixed wing. The proprotors are positioned with the rotor blades in a generally horizontal orientation for a hover, or helicopter, mode, and they are positioned with the rotor blades in a generally vertical orientation for a forward-flight, or airplane, mode. The proprotors on a tiltrotor aircraft generally have a smaller rotor disc area (with higher installed power) than the main rotor on a comparably-sized helicopter. Thus, tiltrotor aircraft can utilize smaller ducts that would not be feasible on a similarly-sized helicopter. Even though tiltrotor aircraft would seem to be a good fit for ducted proprotors, tiltrotor aircraft are rarely fitted with ducted proprotors. However, in U.S. patent application Ser. No. 15/811,002, filed on Nov. 13, 2017, which is incorporated herein by reference in its entirety, a tiltrotor aircraft having segmented ducts for tilting proprotors is disclosed.

BRIEF DESCRIPTION OF THE DRAWINGS

FIG. 10 is a partially exploded oblique view of a ducted thruster, according to this disclosure, with a partial cutout.

FIG. 11 is a front view of a rotor assembly of the ducted thruster of FIG. 10, with a partial cutout.

FIG. 12 is a diagram illustrating the orientations of rotor blades and stator vanes of the ducted thruster of FIG. 10.

FIG. 13 is a partial front view of another ducted thruster of FIG. 10.

FIG. 20 is a table showing a modulated angular distribution of the rotor assemblies of FIGS. 18 and 19.

DETAILED DESCRIPTION

Figure 1:
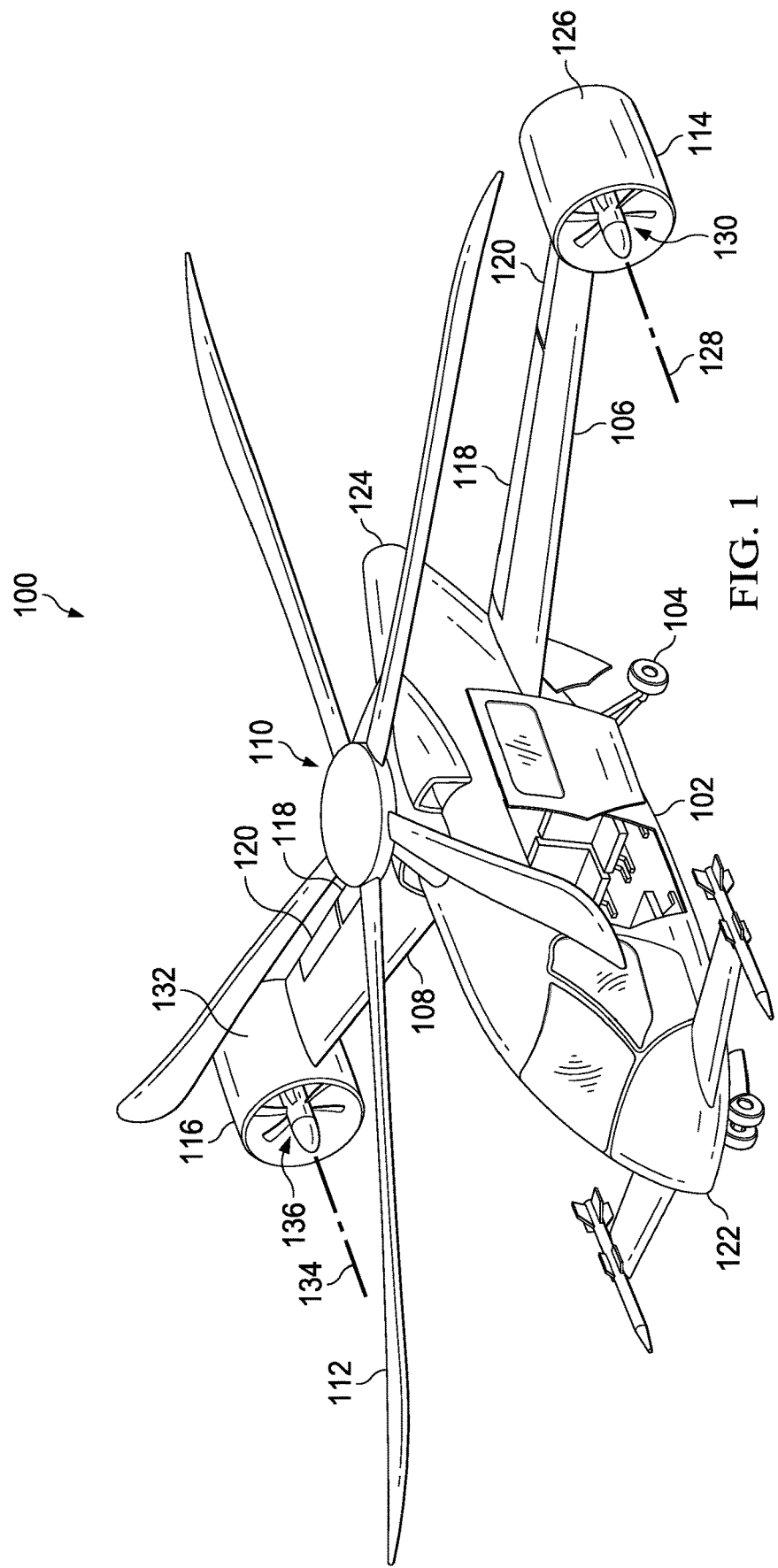
FIG. 1 is an oblique view of a helicopter with two ducted forward-facing thrusters, according to this disclosure.
Figure 2:
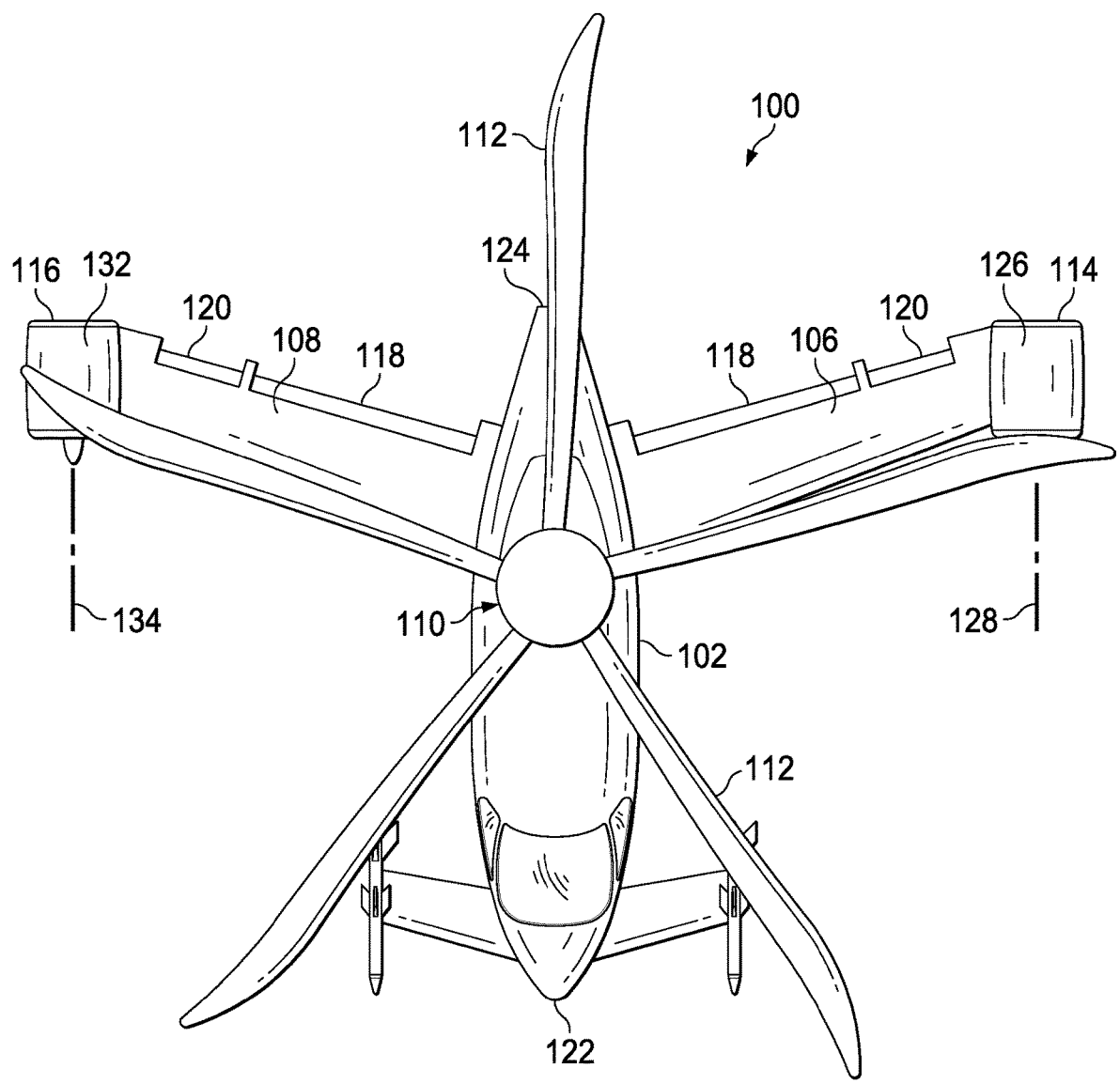
FIG. 2 is a top view of the helicopter of FIG. 1.
Figure 3:
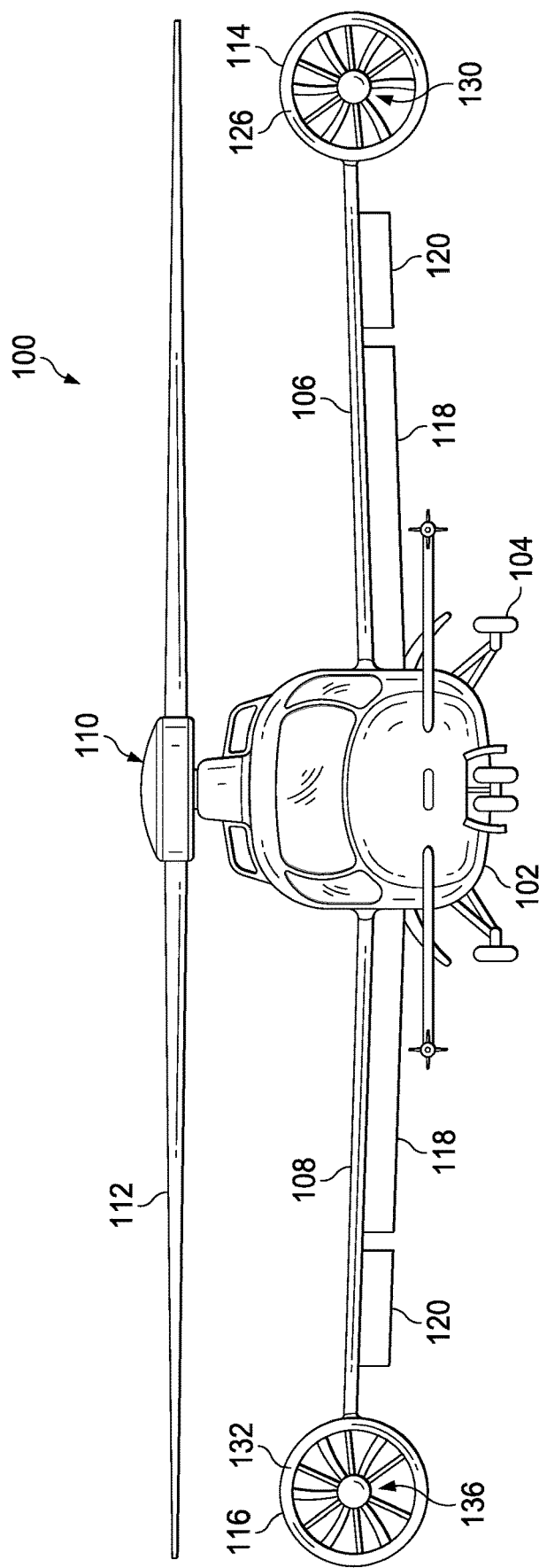
FIG. 3 is a front view of the helicopter of FIG. 1.
Figure 4:
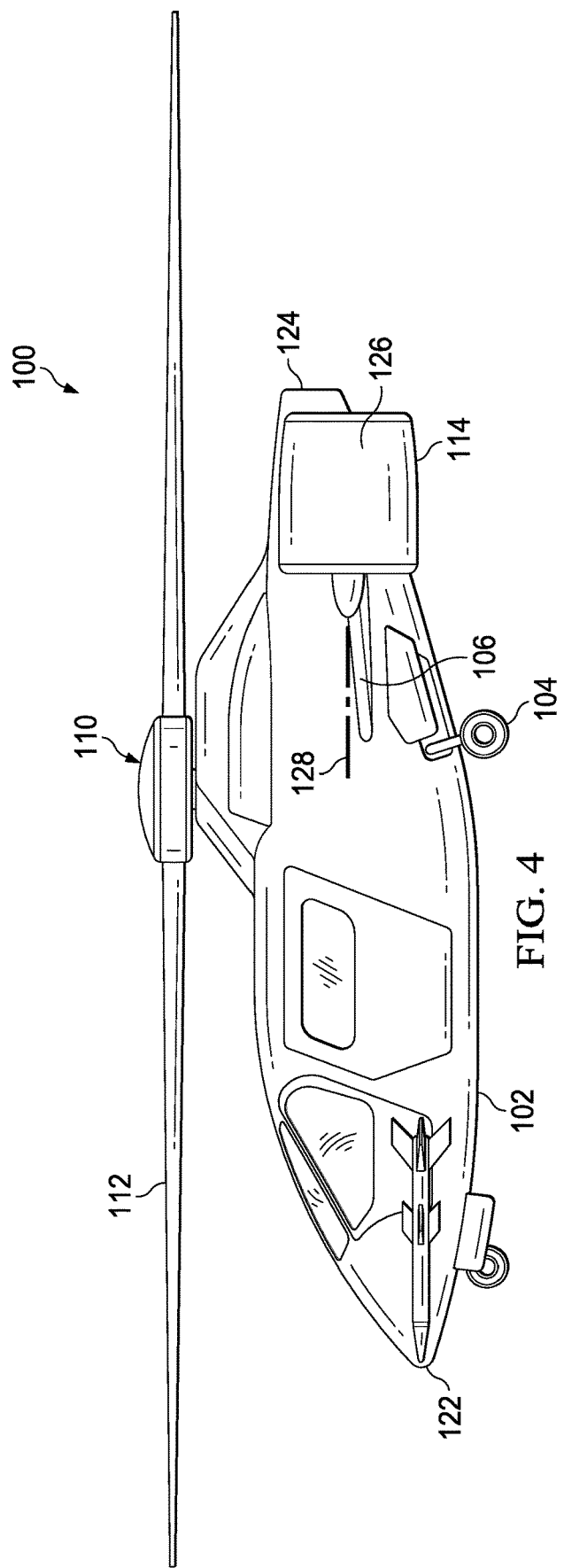
FIG. 4 is a side view of the helicopter of FIG. 1.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges aerodynamic and acoustic improvements for aircraft with ducted forward-facing thrusters and ducted tilting proprotors. FIGS. 1-9 show examples of aircraft with ducted forward-facing thrusters and ducted tilting proprotors. Any of the various features described below may be incorporated thereon. Moreover, the aircraft shown are for illustration purposes only, and the ducted forward-facing thrusters and ducted tilting proprotors disclosed herein may be utilized on any aircraft, such as, for example, an airplane.

Referring to FIGS. 1-4 in the drawings, a helicopter 100 is illustrated. Helicopter 100 comprises a fuselage 102, a landing gear 104, a left wing 106, a right wing 108, a main rotor system 110 comprising main rotor blades 112, a first ducted thruster 114 carried by left wing 106, and a second ducted thruster 116 carried by right wing 108. Each of left wing 106 and right wing 108 comprise an inner flaperon 118 and an outer flaperon 120. Main rotor blades 112, first ducted thruster 114, second ducted thruster 116, inner flaperons 118, and outer flaperons 120 can be controlled in order to selectively control direction, thrust, and lift of helicopter 100.

Fuselage 102 comprises a front end 122, a tail end 124, and a length therebetween. First ducted thruster 114 comprises a first duct 126 having a first central longitudinal axis 128 that is generally parallel to a vertical plane bisecting fuselage 102 along the length thereof and a first thruster assembly 130 supported within first duct 126. Second ducted thruster 116 comprises a second duct 132 having a second central longitudinal axis 134 that is generally parallel to the vertical plane bisecting fuselage 102 along the length thereof and a second thruster assembly 136 supported within second duct 132.

Figure 5:
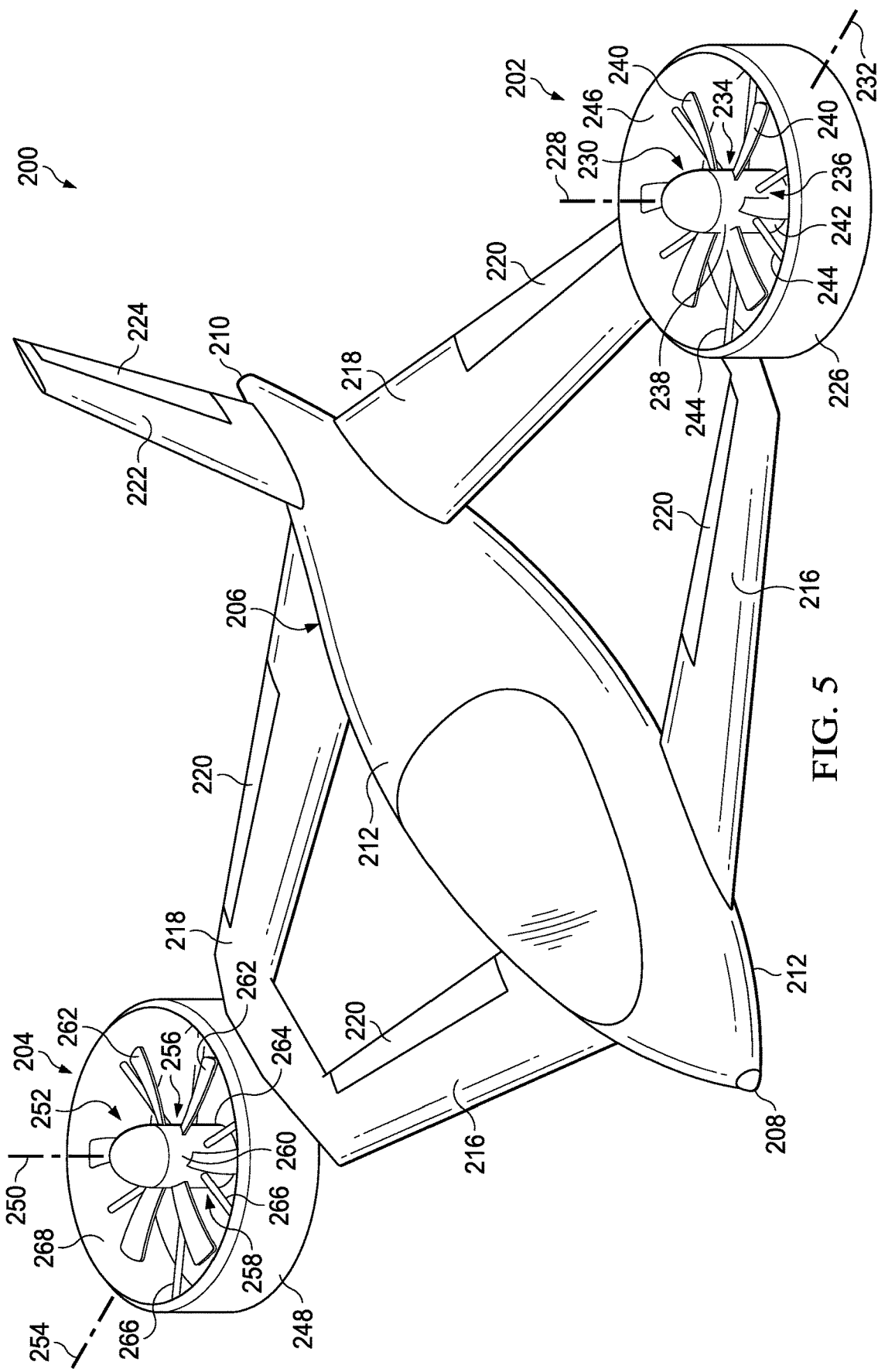
FIG. 5 is an oblique view of a tiltrotor aircraft with two ducted tilting proprotors, according to this disclosure, shown in a helicopter mode.
Figure 6:
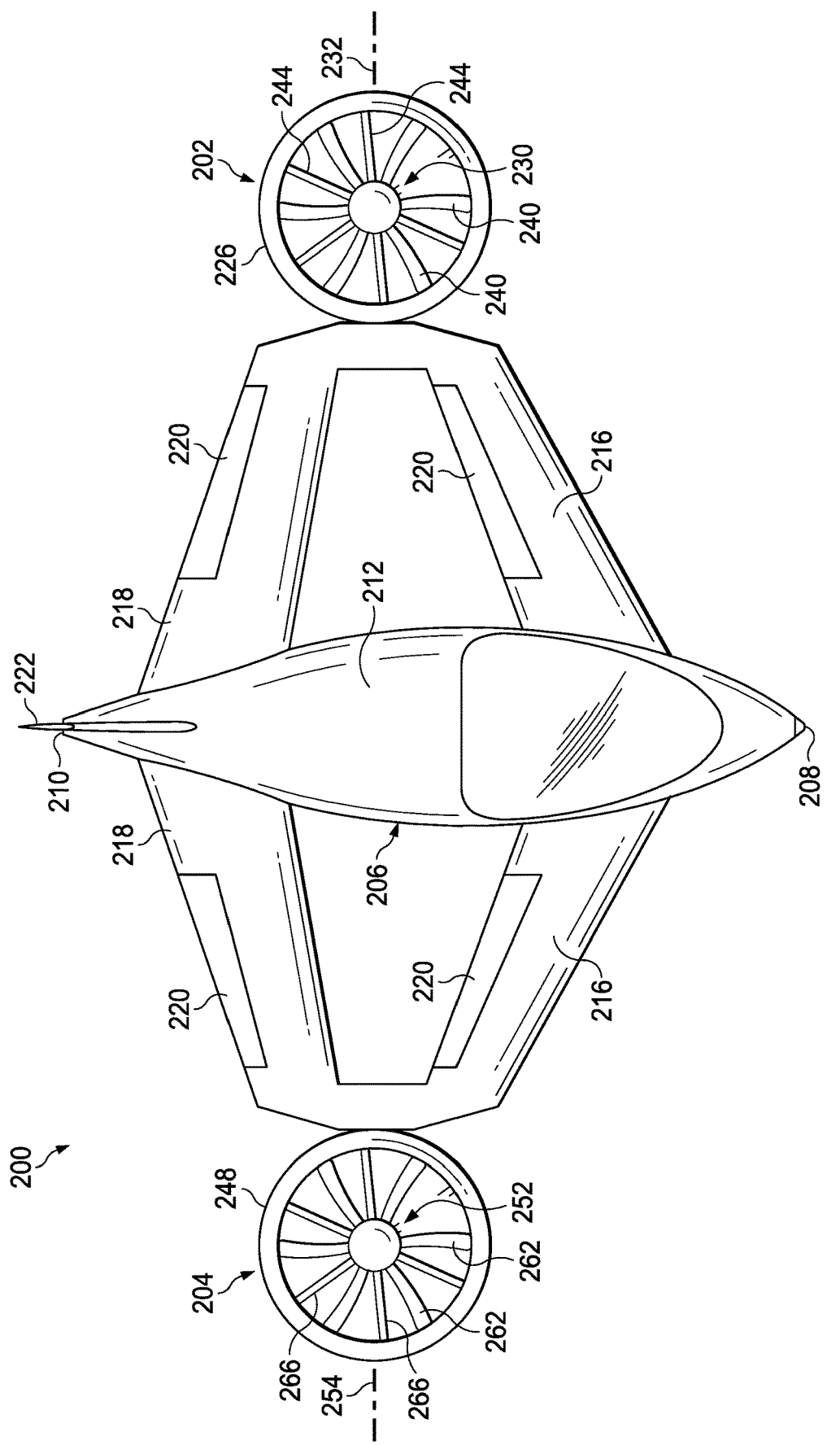
FIG. 6 is a top view of the aircraft of FIG. 5, shown in the helicopter mode.
Figure 7:
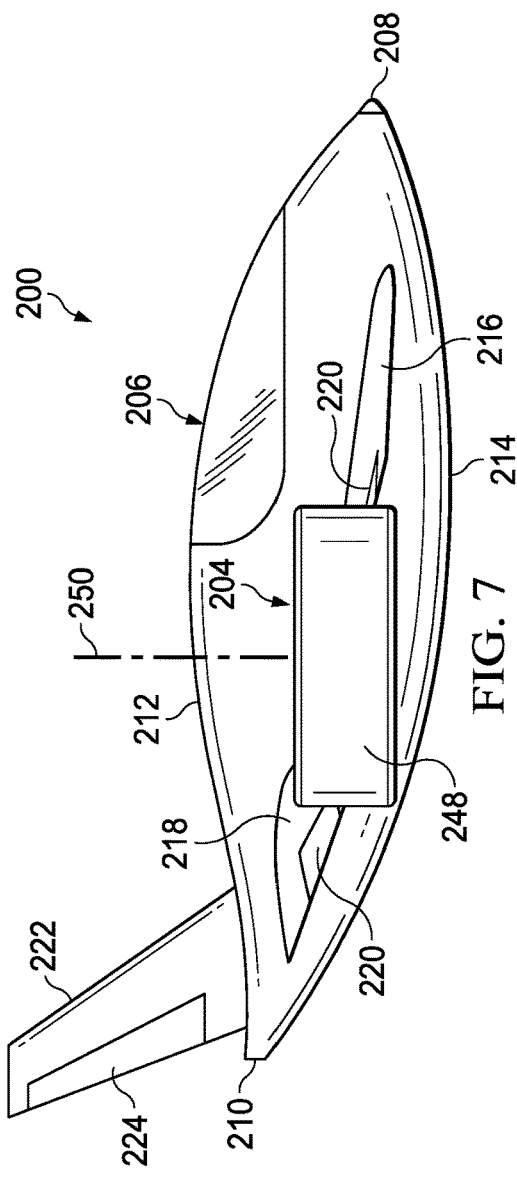
FIG. 7 is a side view of the aircraft of FIG. 5, shown in the helicopter mode.
Figure 8:
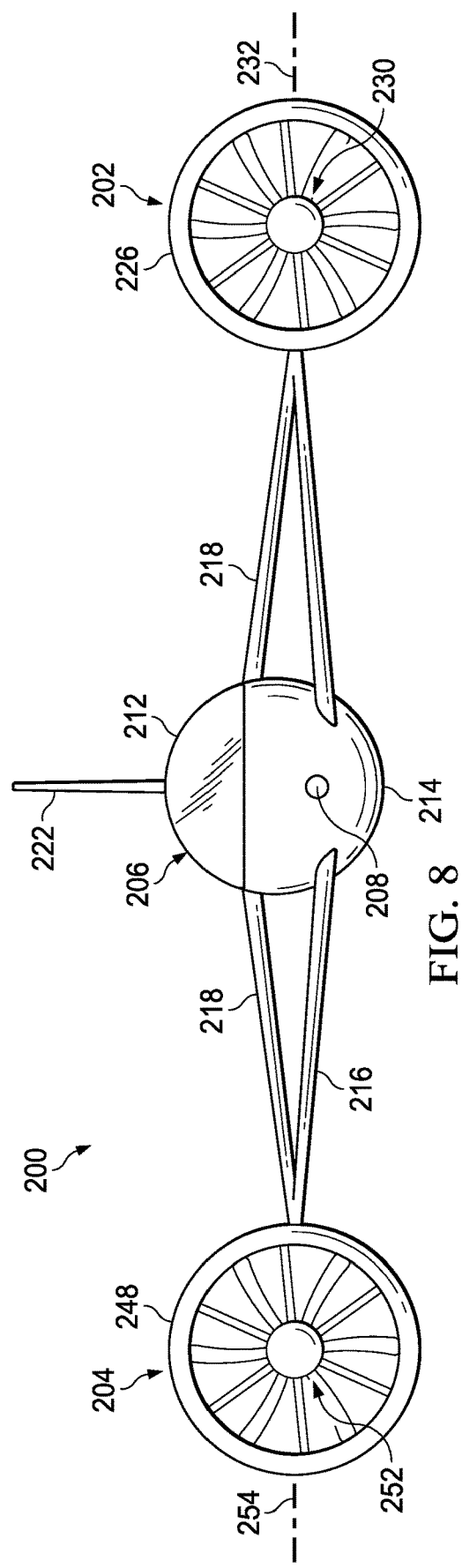
FIG. 8 is a front view of the aircraft of FIG. 5, shown in an airplane mode.
Figure 9:
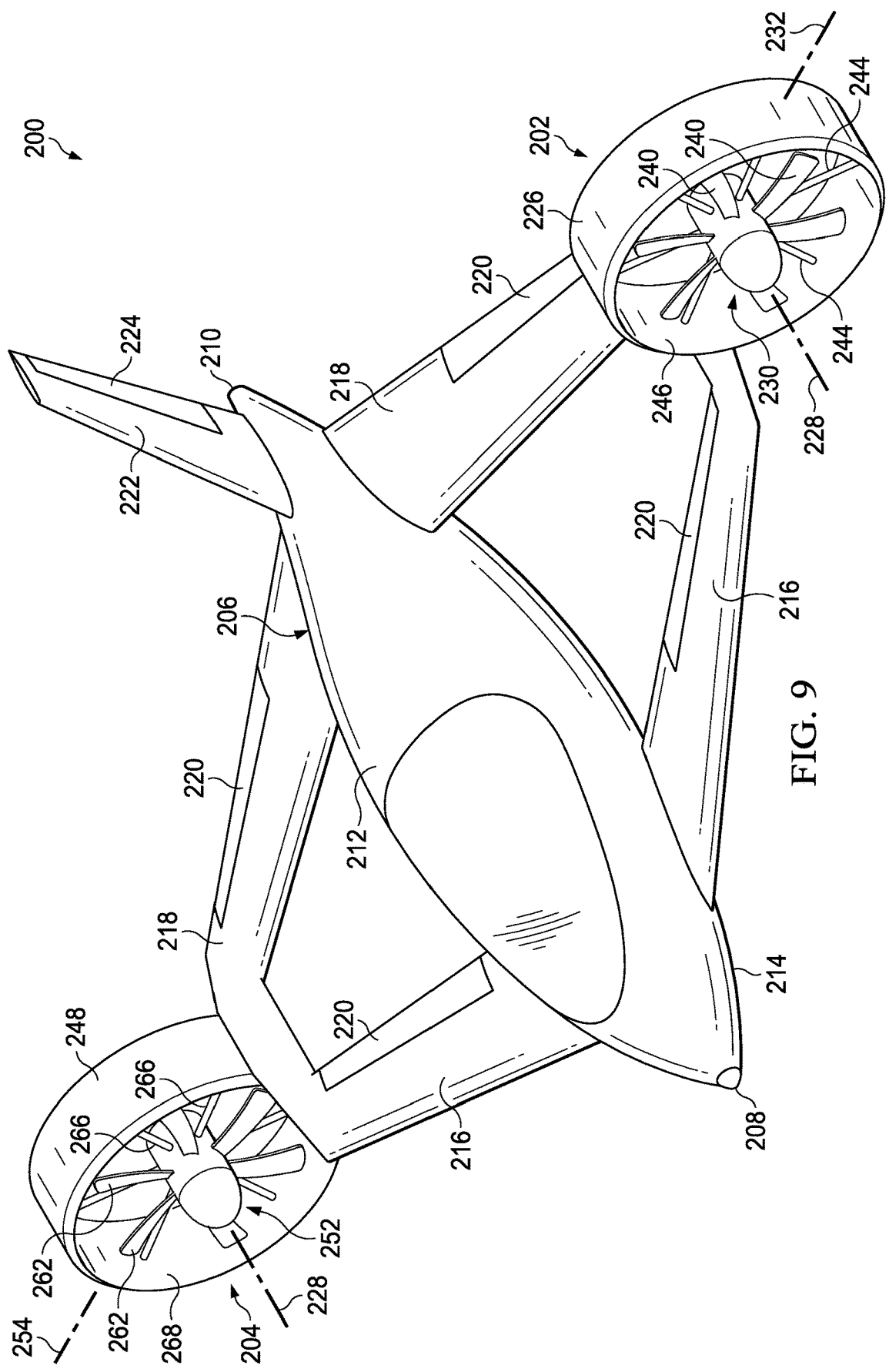
FIG. 9 is an oblique view of the tiltrotor aircraft of FIG. 5, shown in the airplane mode.

FIGS. 5-9 illustrate an aircraft 200 with a first tilting proprotor 202 and a second tilting proprotor 204, that enable aircraft 200 to operate in a helicopter mode when first and second tilting proprotors 202 and 204 are in a generally horizontal configuration, referred to as a helicopter position (as shown in FIGS. 5-7), and in an airplane mode when first and second tilting proprotors 202 and 204 are in a generally vertical configuration, referred to as an airplane position (as shown in FIGS. 8 and 9). Aircraft 200 includes a fuselage 206 with a front end 208, a tail end 210, a top portion 212, and a bottom portion 214. A first set of wings 216 that provide lift in airplane mode extend bilaterally from bottom portion 214 proximate front end 208. A second set of wings 218 that provide additional lift in airplane mode extend bilaterally from top portion 212 proximate tail end 210. First set of wings 216 are angled toward tail end 210 and second set of wings 218 are angled toward front end 208 such that the tips of first and second sets of wings 216 and 218 join at first and second tilting proprotors 202 and 204. As such, aircraft 200 is configured as a negative stagger joined-wing aircraft. However, first and second tilting proprotors 202 and 204 may be used on any aircraft that would benefit from vertical lift in one mode and propulsive thrust in another.

First and second sets of wings 216 and 218 both include control surfaces 220 proximate the trailing ends thereof. Control surfaces 220 may comprise flaps, ailerons, spoilers, or any combination thereof. Control surfaces 220 may be used to increase or decrease lift or drag, change pitch, or roll aircraft 200 while in airplane mode. A vertical tail fin 222 extends from top portion 212 proximate tail end 210. Vertical tail fin 222 includes a rudder 224 to affect yaw of aircraft 200.

First tilting proprotor 202 comprises a first duct 226 having a first central longitudinal axis 228 that is generally parallel to a vertical plane bisecting fuselage 206 along a length thereof and a first thruster assembly 230 supported within first duct 226. First tilting proprotor 202 is rotatable about a first tilt axis 232 that is generally perpendicular to first central longitudinal axis 228. First thruster assembly 230 comprises a first rotor assembly 234 rotatably coupled about first central longitudinal axis 228 within first duct 226 and a first stator assembly 236 coupled within first duct 226. First rotor assembly 234 comprises a first rotor hub 238 and a plurality of first rotor blades 240 extending from first rotor hub 238. First stator assembly 236 comprises a first stator hub 242 and a plurality of first stator vanes 244 extending from first stator hub 242 to an interior surface 246 of first duct 226.

Second tilting proprotor 204 comprises a second duct 248 having a second central longitudinal axis 250 that is generally parallel to the vertical plane bisecting fuselage 206 along the length thereof and a second thruster assembly 252 supported within second duct 248. Second tilting proprotor 204 is rotatable about a second tilt axis 254 that is generally perpendicular to second central longitudinal axis 250. Second thruster assembly 252 comprises a second rotor assembly 256 rotatably coupled about second central longitudinal axis 250 within second duct 248 and a second stator assembly 258 coupled within second duct 248. Second rotor assembly 256 comprises a second rotor hub 260 and a plurality of second rotor blades 262 extending from second rotor hub 260. Second stator assembly 258 comprises a second stator hub 264 and a plurality of second stator vanes 266 extending from second stator hub 264 to an interior surface 268 of second duct 248.

FIGS. 10-15 show various components of a ducted thruster 300 for use on an aircraft as a tilting proprotor or forward-facing thruster. Ducted thruster 300, shown in FIG. 10 attached to a wing 302, comprises a duct 304 having a central longitudinal axis 306 and a thruster assembly 308 supported within duct 304. Thruster assembly 308 comprises a rotor assembly 310 rotatably coupled about central longitudinal axis 306 within duct 304 and a stator assembly 312 coupled within duct 304 downstream of rotor assembly 310 with respect to a direction of the airflow through duct 304. Rotor assembly 310 comprises a rotor hub 314 and a plurality of variable-pitch rotor blades 316 extending from rotor hub 314. Stator assembly 312 comprises a stator hub 318 and a plurality of stator vanes 320 extending from stator hub 318 to an interior surface 322 of duct 304.

Figure 15A:
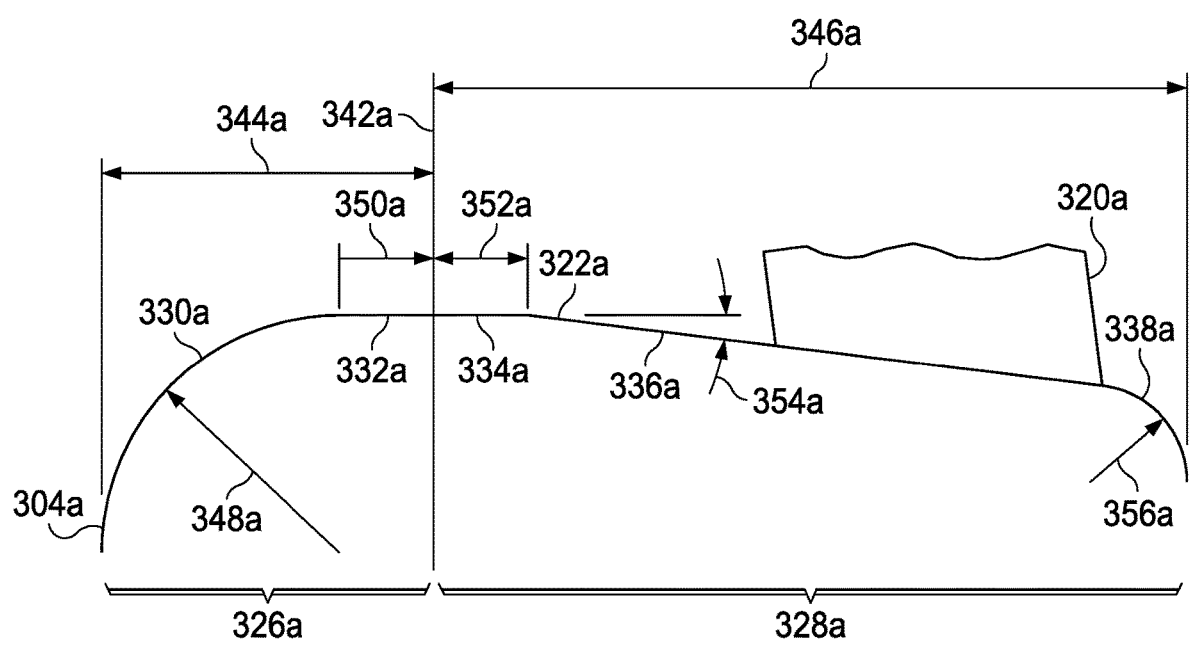
FIG. 15A is a partial cross-sectional side view of a duct of the ducted thruster of FIG. 10.
Figure 15B:
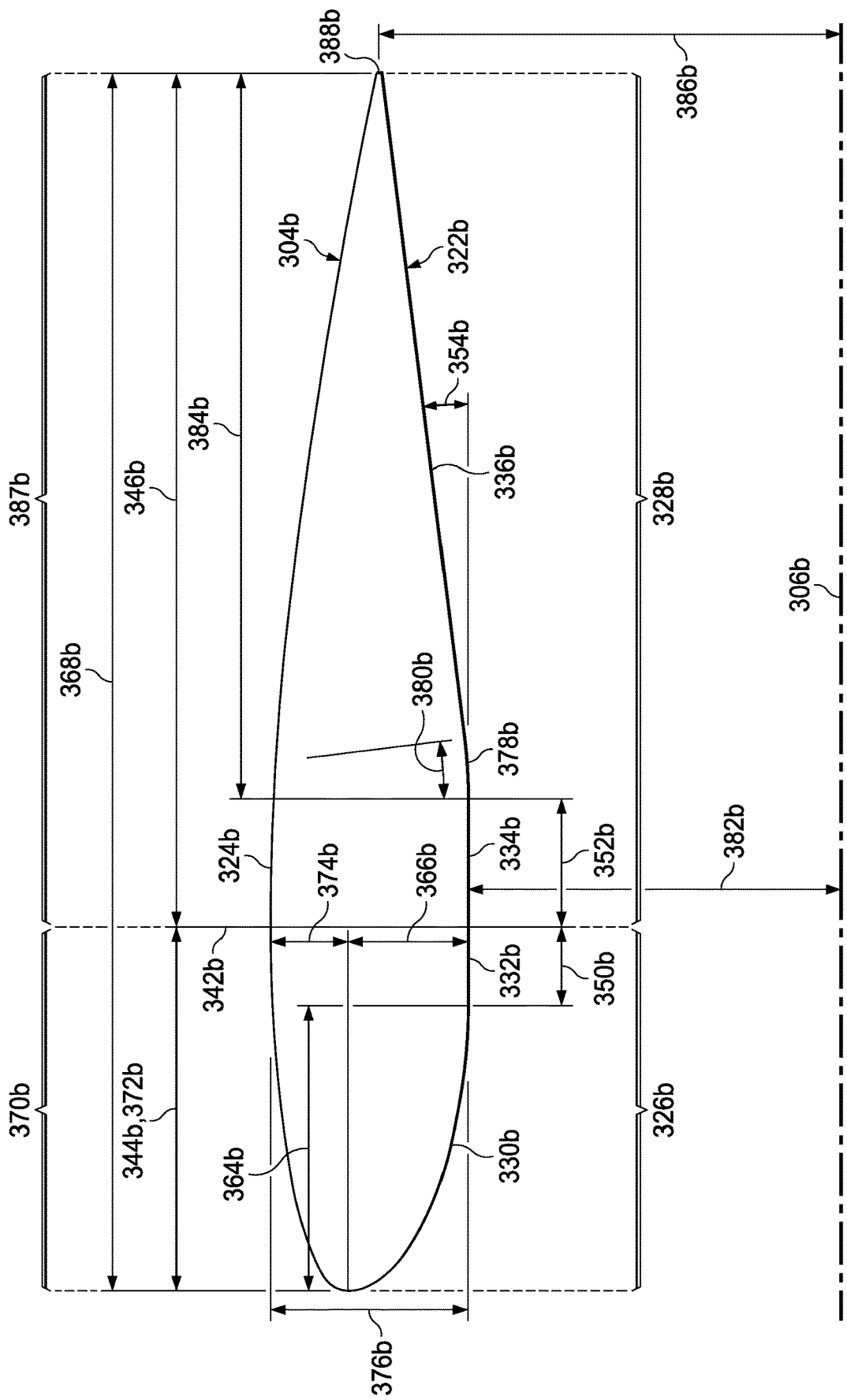
FIG. 15B is a partial cross-sectional side view of a duct of another ducted thruster, according to this disclosure.
Figure 16:
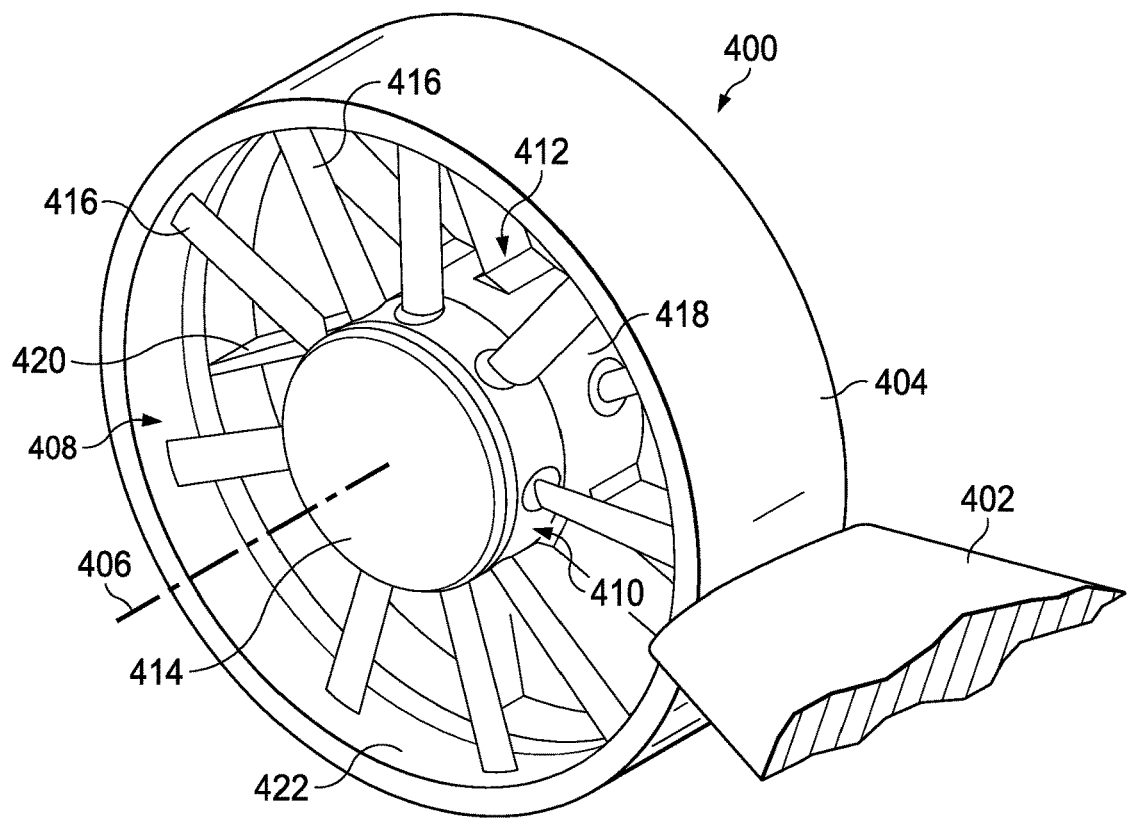
FIG. 16 is an oblique view of another ducted thruster, according to this disclosure.

Duct 304 has a substantially axisymmetric shape about central longitudinal axis 306, described hereafter with reference to FIGS. 15A and 15B. Corresponding elements shown in FIGS. 15A and 15B are labeled with common element numbers, with an (a) or (b) for FIG. 15A or FIG. 15B, respectively. FIG. 15A shows a first exemplary shape of interior surface 322 of duct 304 and FIG. 15B shows a second exemplary shape of interior surface 322 of duct 304, as well as an exterior surface 324b. In FIG. 15A, duct 304a includes a collector 326a, corresponding to a portion of interior surface 322a generally upstream of rotor assembly 310, and a diffuser 328a, corresponding to a portion of interior surface 322a generally downstream of rotor assembly 310. Collector 326a comprises a convergent inlet nozzle 330a and a cylindrical portion 332a extending from inlet nozzle 330a to rotor assembly 310. Diffuser 328a comprises a cylindrical portion 334a extending from rotor assembly 310 downstream, a frustoconical portion 336a extending from cylindrical portion 334a downstream, and an outlet 338a. Rotor assembly 310 is mounted in duct 304a so that its rotor blades 316 rotate within cylindrical portions 332a and 334a. Each of rotor blades 316 has a pitch-change axis 340, wherein pitch-change axes 340 define a rotor plane 342a in which they rotate and which is substantially perpendicular to central longitudinal axis 306. Collector 326a has a length 344a along central longitudinal axis 306, and diffuser 328a has a length 346a along central longitudinal axis 306. Collector 326a includes inlet nozzle 330a with a constant radius 348a and cylindrical portion 332a with a length 350a along central longitudinal axis 306. Diffuser 328a includes cylindrical portion 334a with a length 352a along central longitudinal axis 306, frustoconical portion 336a diverging from cylindrical portion 334a with a half-angle 354a, and outlet 338a with a constant radius 356a.

Length 344a of cylindrical portion 332a should preferably be between 2% and 8% of a diameter 358 of cylindrical portion 332a. A minimum magnitude of length 344a of collector 326a (radius 348a plus length 350a) should be approximately 10% of diameter 358. Radius 348a of inlet nozzle 330a should be approximately 8% of diameter 358. The position of rotor plane 342a is defined as a function of a chord length 360 of rotor blades 316, their positive pitch angle, a distance 362 between their leading edges and their pitch change axes 340 (wherein distance 362 is approximately 40% of chord length 360), and a maximum deformation of rotor blades 316. Length 350a should be greater than the sine of the maximum pitch angle times distance 362 plus the maximum deformation. In order to avoid any overhang of rotor blades 316 in front of cylindrical portion 332a, an additional margin of 1.33% of diameter 358 may be added. Length 352a of cylindrical portion 334a of diffuser 328a may be between 1% and 3.5% of diameter 358. Length 352a is preferably less than the sine of the maximum pitch angle times the difference between chord length 360 and distance 362. Half-angle 354a of frustoconical portion 336a is preferably between approximately 5 degrees and approximately 20 degrees.

As shown in FIG. 15B, duct 304b includes a collector 326b, corresponding to a portion of interior surface 322b generally upstream of rotor assembly 310, and a diffuser 328b, corresponding to a portion of interior surface 322b generally downstream of rotor assembly 310. Collector 326b comprises a convergent inlet nozzle 330b and a cylindrical portion 332b extending from inlet nozzle 330b to rotor assembly 310. Diffuser 328b comprises a cylindrical portion 334b extending from rotor assembly 310 downstream and a frustoconical portion 336b extending from cylindrical portion 334b downstream. Rotor assembly 310 is mounted in duct 304b so that its rotor blades 316 rotate within cylindrical portions 332b and 334b. Each of rotor blades 316 has a pitch-change axis 340, wherein pitch change axes 340 define a rotor plane 342b in which they rotate and which is substantially perpendicular to central longitudinal axis 306b. Collector 326b has a length 344b along central longitudinal axis 306b, and diffuser 328b has a length 346b along central longitudinal axis 306b. Inlet nozzle 330b may comprise a quarter elliptical or quarter super-elliptical shape with a semi-major axis 364b and a semi-minor axis 366b. Semi-major axis 364b may be between 10% and 90% of a total chord length 368b of duct 304b, depending on the application, but semi-major axis 364b will generally be equal to about 30% of chord length 368b for most applications. Cylindrical portion 332a has a length 350b along central longitudinal axis 306b. A leading portion 370b of exterior surface 324b may also comprise a quarter elliptical or quarter super-elliptical shape with a semi-major axis 372b and a semi-minor axis 374b. While semi-major axis 372b is shown as being equal to length 344b, it may be greater or less than length 344b, depending on the application. The magnitude of semi-minor axis 366b of inlet nozzle 330b may be approximately 1.67 times the magnitude of semi-minor axis 374b of leading portion 370b. Alternatively, the magnitude of semi-minor axis 366b may be defined as a percentage of total airfoil thickness 376b of duct 304, wherein total airfoil thickness 376b is equal to the sum of the magnitudes of semi-minor axes 366b and 374b. The magnitude of semi-minor axis 366b may be between 5% and 95% of total airfoil thickness 376b, depending on the application, but will generally be equal to about 62.5% of total airfoil thickness 376b for most applications. The position of rotor plane 342b is defined as a function of chord length 360 of rotor blades 316, their positive pitch angle, distance 362 between their leading edges and their pitch change axes 340 (wherein distance 362 is approximately 40% of chord length 360), and a maximum deformation of rotor blades 316. Length 350b should be greater than the sine of the maximum pitch angle times distance 362 plus the maximum deformation. In order to avoid any overhang of rotor blades 316 in front of cylindrical portion 332b, an additional margin of 1.33% of diameter 358 may be added.

Diffuser 328b includes cylindrical portion 334b, with a length 352b along central longitudinal axis 306b, frustoconical portion 336b diverging from cylindrical portion 334b with a half-angle 354b, and a transition section 378b between cylindrical portion 334b and frustoconical portion 336b having a radius 380b. Length 352b of cylindrical portion 334b of diffuser 328b may be between 1% and 3.5% of diameter 358. Length 352b is preferably less than the sine of the maximum pitch angle times the difference between chord length 360 and distance 362. Half-angle 354b of frustoconical portion 336b may be between 0 degrees and approximately 20 degrees. Radius 380b will be determined by manufacturing constraints, desired diffusion, length 346b of diffuser 328b, and half-angle 354b. Radius 380b may be equal to zero when half-angle 354b is equal to 0 degrees. When half-angle 354b is greater than 0, the following expression may define the relationship between radius 380$b$, half-angle 354$b$, a radius 382$b$ of cylindrical portion 334$b$, a length 384$b$ of transition section 378$b$ and frustoconical portion 336$b$, and a duct radius 386$b$ at an exit of diffuser 328$b$:

$$382b(386b/382b-1) = 384b\tan354b - 380b(1-\cos354b)\left(\frac{\tan354b}{\tan(354b/2)}-1\right)$$

A trailing portion 387$b$ of exterior surface 324$b$ is a curve that is tangent with leading portion 370$b$ at the junction therebetween and intersects frustoconical portion 336$b$ at a trailing edge 388$b$ at an angle that provides acceptable camber to the rear of trailing edge 388$b$, preferably such that a tangent of 387$b$ at trailing edge 388$b$ forms an angle relative to central longitudinal axis 306$b$ that is approximately equal to half-angle 354$b$.

The first exemplary shape shown in FIG. 15A may be more suitable for use on a tiltrotor that is likely to be utilized more often in helicopter mode as the wide radius 348$a$ may increase hover efficiency in helicopter mode but will increase drag in airplane mode. Whereas the second exemplary shape, shown in FIG. 15B, is optimized for increasing thrust on a fixed forward thruster or a tiltrotor likely to be utilized more often in airplane mode. It should be understood that if duct 304 is intended primarily for safety and/or noise reduction, rather than increased thrust/hover efficiency, other modifications may be included. For example, chord length 368 of duct 304 may be reduced, cylindrical portions 332 and 334 may be omitted, frustoconical section 336 may be curved instead of being frustoconical, etc.

Referring now to FIG. 10, rotor assembly 310 is rotationally coupled within duct 304 and is driven by a gearbox (not shown) within stator hub 318. Stator hub has a substantially cylindrical external shape and is coaxial with central longitudinal axis 306 and is secured to interior surface 322 of duct 304 by stator vanes 320. The gearbox in stator hub 318 is driven by a drive shaft (not shown) passing through a sleeve 390 and wing 302 and connected to a main gearbox (not shown). Sleeve 390 is arranged in duct 304 substantially in the place of one of stator vanes 320. Rotation of rotor assembly 310 within duct 304 creates a guided flow of air which provides thrust in the direction of central longitudinal axis 306. In order to vary the amplitude of this thrust, stator assembly 312 and/or rotor assembly 310 comprise a mechanism for collective control of the pitch of rotor blades 316.

Stator vanes 320, fixed in duct 304 downstream of rotor blades 316, recover the rotational energy of the airflow downstream of rotor blades 316, by straightening out the airflow towards the central longitudinal axis 306 and generating a supplementary thrust. As shown in FIG. 12, two rotor blades 316 which rotate with rotational speed U=ΩR have been represented diagrammatically upstream of two stator vanes 320. This speed U is combined with the axial inlet speed Vo1 of the air in order to give a relative speed W1 of the flow of air at rotor assembly 310, this latter speed establishing a pressure field around each rotor blade 316. This field then gives rise to an aerodynamic resultant R1 which may, on the one hand, be broken down into a lift force Fz1 and a drag force Fx1 and, on the other hand, gives rise to an axial thrust S1 of direction orthogonal to the direction of the speed U of rotation of rotor blades 316, and in the opposite direction to Vo1.

As a consequence of the first obstacle constituted by each rotor blade 316, the air leaves rotor assembly 310 under different speed conditions, and the outlet speeds triangle makes it possible to discern a new speed W2 relative to rotor blade 316, less than W1, and an absolute speed V2 which acts on a stationary stator vane 320 facing it. The speed V2 fulfilling, for the stationary stator vane 320, the same role as did the speed W1 for the moving rotor blade 316, V2 establishes a pressure field around each stator vane 320, and this field gives rise to an aerodynamic resultant R2 which, on the one hand, is broken down into a lift force Fz2 and a drag force Fx2 and, on the other hand, gives rise to an axial thrust S2 which is an additional thrust adding to the thrust S1. Upon leaving stator vanes 320, the airflow is straightened and its speed V3 may be practically axial (parallel to central longitudinal axis 306) by a suitable choice of the asymmetric aerodynamic profile of stator vanes 320, and in particular their camber and angular setting with respect to central longitudinal axis 306.

In ducted thruster 300, the arrangement of stator assembly 312 with profiled stator vanes 320 downstream of rotor assembly 310 in duct 304 makes it possible to produce a compact, balanced and rigid thrust generating device which, without modifying the power required for driving rotor assembly 310 gives increased thrust. The efficiency of such a thrust generating device is thus linked to the characteristics of rotor assembly 310, the performance level required to fly the aircraft depends mainly on the choice of diameter of rotor assembly 310, and therefore of duct 304, on the peripheral speed of rotor blades 316, the number of rotor blades 316, their chord length 360, and on their profile and twist law, to the characteristics of stator assembly 312, when it exists, and particularly on the number of stator vanes 320, their chord, their profile (camber, setting, etc.), as well as to the characteristics of duct 304.

In addition, acoustic optimization of ducted thruster 300 is ensured by distributing acoustic energy over the entire frequency spectrum, by adopting an uneven angular distribution of rotor blades 316, termed azimuth modulation or phase modulation, and by reducing the acoustic energy level emitted by ducted thruster 300, by reducing the peripheral speed of rotor blades 316, by reducing the interference between rotor assembly 310 and stator assembly 312 and sleeve 390 by virtue of a specific configuration and arrangement of these elements within duct 304, with a suitable separation from rotor assembly 310.

For a rotor assembly 310 comprising ten rotor blades 316, an example of uneven phase or azimuth modulation is represented in FIG. 11. The object of this phase modulation is to disrupt the conventional angular symmetry or conventional equi-angular distribution of rotor blades 316, in order not to reduce the acoustic energy emitted but to distribute it more favorably over the frequency spectrum, contrary to that which is obtained in the absence of modulation (equally distributed blades), namely a concentration of the energy over specific frequencies (such as bΩ, 2bΩ, 3bΩ, etc.).

A phase modulation law for rotor blades 316 is a sinusoidal law or close to a sinusoidal law of type:

$$\Theta n = n \times \frac{360°}{b} + \Delta\Theta\sin\left(m \times n \times \frac{360°}{b}\right)$$

where Θn is the angular position of the nth rotor blade 316 counted successively from an arbitrary angular origin, b being the number of rotor blades 316, and m and ΔΘ are the parameters of the sinusoidal law corresponding, in the case of m, to a whole number which is not prime with the number b of rotor blades 316 whereas AΘ is chosen to be greater than or equal to a minimum value ΔΘ min chosen as a function of the number b of rotor blades 316 and which decreases as b increases.

It should be understood that $$n \times \frac{360°}{b}$$

represents the angular position of the nth rotor blade 316, in an equally distributed configuration, whereas $$\Delta\Theta \sin\left(m \times n \times \frac{360°}{b}\right)$$

corresponds to the azimuth modulation term with respect to the equally distributed configuration. The parameters m and AⓇ are chosen as a function of the number b of rotor blades 316 in order, at the same time, to provide dynamic balancing of rotor assembly 310, optimum distribution of the energy over the frequency spectrum, and guarantee a minimal inter-blade angular separation imposed by the conditions of angular excursions of the blades in terms of pitch and structural adherence of rotor blades 316 to rotor hub 314. The whole number m is chosen in the following fashion: it is first of all chosen to respect dynamic balancing of rotor assembly 310. By writing this balance, the following two equations which have to be satisfied are obtained:

$$\Sigma \cos \Theta n = 0 \text{ and } \Sigma \sin \Theta n = 0$$

For the sinusoidal modulation law Θn given hereinabove, these two equations are satisfied if m and b are not prime with each other. The possible choices for m as a function of the number b of rotor blades 316 varying from 6 to 12 are given by crosses in Table 1 below.

TABLE 1

| m | 6 | 7 | 8 | 9 | 10 | 11 | 12 |
|---|---|---|---|---|----|----|----|
| 2 | X |   | X |   | X  |    | X  |
| 3 | X |   |   | X |    |    | X  |
| 4 | X |   | X |   | X  |    | X  |

As a function of the possibilities offered in Table 1, the whole number m is as small as possible and preferably fixed to 2 or 3 in order to obtain the densest possible spectrum, and therefore, a better distribution of energy per third of an octave. The parameter m may, just about, be equal to 4, but the value of 1 is to be avoided.

The parameter ΔΘ must be chosen in the following fashion: it is greater than or equal to a minimum value ΔΘ min given by an acoustic criterion for a given number of rotor blades 316, as indicated in Table 2 hereinbelow.

TABLE 2

| | b | | | | |
|---|---|---|---|---|---|
| | 6 | 8 | 9 | 10 | 12 |
| ΔΘ min | 14.34° | 10.75° | 9.55° | 8.60° | 7.17° |

These values correspond to one and the same angular phase shift ΔΦ=bΔΘ, which comes into play as a parameter of Bessel functions characterizing the levels of the spectral lines of a sinusoidal modulation, with respect to the fundamental line, as explained in an article entitled "Noise Reduction by Applying Modulation Principles" by Donald Ewald et al., published in "The Journal of the Acoustical Society of America", volume 49, Number 5 (part 1) 1971, pages 1381 to 1385, which is incorporated herein by reference in its entirety. The angular phase shift ΔΦ=1.5 radian corresponds to the value above which the Bessel function Jo (ΔΦ) is less than or equal to the Bessel functions Jn (ΔΦ) where n is other than 0 (see FIG. 2 of the abovementioned article). This makes it possible to minimize the emergence of the fundamental in b Ω with regard to the adjacent lines, because Jo (ΔΦ) represents the weighting coefficient on the fundamental line, whereas J1 (ΔΦ) represents that of the adjacent lines (b−1)Ω and (b+1)Ω, which exist if there is modulation. The angular phase shift ΔΦ=bΔΘ=1.5 radian is the ideal point, because the noise level on the three adjacent lines bΩ (b−1)Ω, and (b+1)Ω is identical, the energy concentrated on the line bΩ for a rotor with equally distributed rotor blades is thus distributed over the three lines. Table 2 thus gives the values of ΔΘ min as a function of b, so that bΔΘ8 min=1.5 radian.

This result corresponds to an ideal case, for which the pressure disturbance function is quite uniform, that is to say for a rotor with a large number of rotor blades (greater than 20). In the case of rotor assembly 310, the relatively lower number of rotor blades 316 renders the pressure disturbance function more impulsive. Also, the above rule may be slightly adapted, which requires variation limits to be defined in order to match the sinusoidal modulation rule to the specific case of ducted thruster 300. In addition, the minimal allowable inter-blade angular separation for enabling the blade angular excursion in terms of pitch without interfering with each other, as well as suitable structural adherence of rotor blades 316 to rotor hub 314 may necessitate a choice of ΔΘ less than AO min recommended by the acoustic criteria (Table 2). For example, if rotor assembly 310 has ten rotor blades 316, the minimum inter-blade angular separation is 24 degrees.

A phase modulation law may therefore be adopted, based on a distorted sinusoidal law, for which bΔΘ may be chosen within the range of values extending from 1.5 radian to 1 radian and/or a variation of ±5 degrees about the angular position given initially by the sinusoidal distribution law for each rotor blade 316 may be adopted in order to cover the constraint of minimal inter-blade angular separation, while retaining good acoustic efficiency due to phase modulation. It should be noted that for bΔΘ=1 radian, the weighting coefficient for the fundamental line bΩ is 0.8 and falls to 0.45 for the adjacent lines (b±1)Ω.

Stator vanes 320 are evenly distributed about central longitudinal axis 306 in order to limit the interference between rotor assembly 310 and stator assembly 312, and in particular in order to avoid any surge phenomenon (dynamic excitation) between rotor assembly 310 and stator assembly 312. The phase modulation of rotor blades 316 is such that any angular separation between two rotor blades 316 which are not necessarily consecutive, is different from any angular separation between any two not necessarily consecutive stator vanes 320. Mathematically, this condition may translate as follows: if Θij represents the angular separation between rotor blades 316 of order i and j, counted successively from an arbitrary angular origin, that is to say the angle defined between the pitch change axes of blades i and j, and if Θkl represents the angular separation between stator vanes 320 of order k and l, then regardless of the values of i, j, k, l, Θij is different from Θkl. This condition is considered to be respected if the differences between the respective angular separations of various rotor blades 316 and of various stator vanes 320 are greater than 1 degree in absolute values, for at least half of stator vanes 320, not counting sleeve 390.

If this angular condition, which prevents two rotor blades 316 from passing simultaneously opposite two stator vanes 320, is not verified by the choice of phase modulation of sinusoidal type of the most advantageous type mentioned above, the angular positions of some rotor blades 316 must be modified by moving away from the sinusoidal law, and adopting a distorted sinusoidal law as mentioned above, that is, since $\Delta\Theta$ cannot then be chosen such that $b\Delta\Theta=1.5$ radian, then $b\Delta\Theta$ is decreased progressively from 1.5 to 1 radian until a suitable value of $\Delta\Theta$ is obtained to respect the above-mentioned geometric condition Θij which is different from Θkl, without dropping below 1 radian, and cumulatively or alternatively a maximum variation of ±5 degrees about the angular position given initially by the sinusoidal distribution law for each rotor blade 316 is permitted.

If a decrease in sound nuisance is sought, avoiding simultaneous interactions between two rotor blades 316 and two stator vanes 320, when rotor blades 316 are equally distributed, it is sufficient to choose a number b of rotor blades 316 which is prime with the number of stator vanes 320, so as not to find an arbitrary angular separation between two not necessarily consecutive rotor blades 316 which is equal to an arbitrary angular separation between two not necessarily consecutive stator vanes 320.

A decrease in acoustic nuisance from the interactions between rotor assembly 310 and stator assembly 312 is also obtained by decreasing the level of acoustic energy emitted by these interactions, independently of the frequencies on which it is concentrated or distributed. As represented in FIG. 13, in order to avoid the interaction between a rotor blade 316 and a stator vane 320 from arising simultaneously over the whole span of the stator vane 320, stator vanes 320 are arranged in a non-radial fashion, and instead are each inclined by an angle V, lying between approximately 5 degrees and approximately 25 degrees to the radial direction, in the opposite direction from the direction of rotation of rotor blades 316 when considering stator vane 320 from central longitudinal axis 306 towards a periphery of duct 304. This direction of inclination makes it possible not only to reduce the noise of interaction between rotor blades 316 and stator vanes 320, but also to ensure better take up of the loadings withstood by the gearbox in stator hub 318, stator vanes 320 operating in compression. In effect, since one of the functions of stator assembly 312 is to support the gearbox, stator vanes 320 may thus best take up the reactive torque to the torque transmitted to rotor assembly 310. In addition, the relative thickness of the aerodynamic profiles of stator vanes 320 is chosen to best reduce the overall size in duct 304, while ensuring sufficient mechanical strength for the function of supporting stator hub 318. The relative thickness of the profiles of stator vanes 320 lies between approximately 8% and approximately 12%.

This choice of relative thickness is compatible with the use, for stator vanes 320, of an aerodynamic profile of NACA 65 type, exhibiting an angle of attack setting to central longitudinal axis 306, which is negative and lies between approximately 2 degrees and approximately 2.5 degrees, and a camber lying between approximately 20 degrees and approximately 28 degrees, these profile characteristics give stator assembly 312 good efficiency.

Furthermore, the reduction in the noise of interaction between rotor assembly 310 and stator assembly 312 becomes significant beyond a minimal axial separation between leading edges of stator vanes 320 and plane of rotation 342 of rotor assembly 310, defined by pitch change axes 340 of rotor blades 316, at approximately 40% of their chord length 360, this minimum separation being at least equal to 1.5 times chord length 360. However, since the support for the gearbox and stator hub 318 in duct 304 is provided by stator vanes 320, in order to give good tolerance on the position of plane of rotation 342 of rotor assembly 310 within duct 304, it is necessary to fix stator assembly 312 as close as possible to plane 342 of rotor assembly 310.

Figure 14:
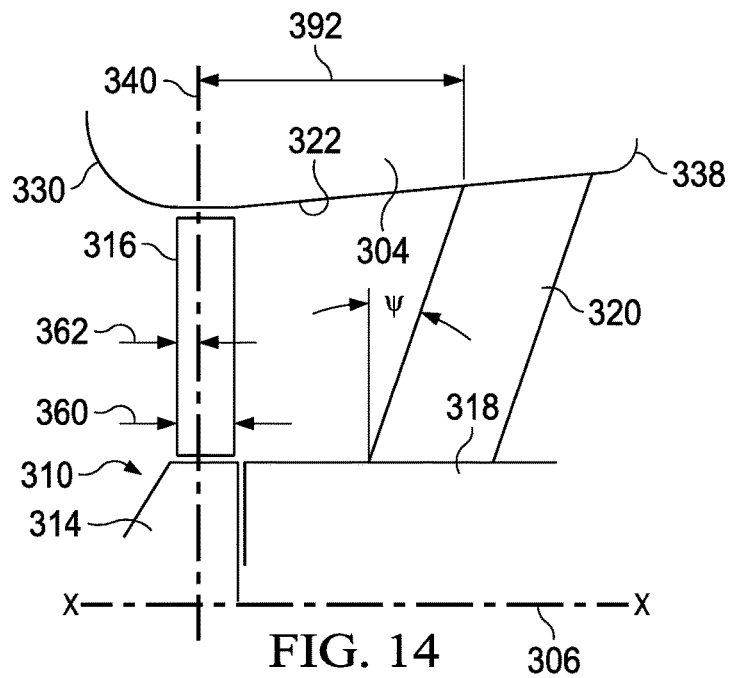
FIG. 14 is a partial cross-sectional side view of a thruster assembly of the ducted thruster of FIG. 10.

A good compromise between these two contradictory requirements, between noise reduction and good tolerance on the position of plane 342, is obtained by inclining stator vanes 320 at an angle Ψ, of approximately 2 degrees to approximately 6 degrees, as represented in an exaggerated manner in FIG. 14. This inclination Ψ of each stator vane 320 at a slant, from central longitudinal axis 306 towards interior surface 322 of duct 304 and from upstream to downstream, makes it possible to keep the leading edge of each stator vane 320 as far away as possible from plane 342, while preserving correct positioning of the gearbox and stator hub 318, and therefore of plane 342 in duct 304. Taking account of the progressive nature of the aerodynamic loading between the roots of stator vanes 320, coupled to stator hub 318, and their more loaded ends coupled to interior surface 322 of duct 304, the influence on noise remains negligible, despite the leading edges of stator vanes 320 coming close behind the roots of rotor blades 316. For these reasons, the axial spacing between plane of rotation 342 and the leading edges of stator vanes 320, at interior surface 322 of duct 304, is a distance 392 lying between approximately 1.5 times chord length 360 and approximately 2.5 times chord length 360.

As stated above, sleeve 390 is likened to a stator vane 320 in order to determine the angular positions of stator vanes 320 and of rotor blades 316, but it is not profiled, and the number of profiled stator vanes 320 is chosen to be greater than or equal to the number of rotor blades 316, less one.

Rotor blades 316 have an aerodynamic profile of the OAF type, with relative thickness and camber which progress along a span, the relative thickness decreasing for example from 13.9% to 9.5% between 40% and 100% of a radius of rotor assembly 310. Likewise, a twist on the profile decreases moving away from central longitudinal axis 306.

In a first example of ducted thruster 300, rotor assembly 310 includes 8 rotor blades 316, wherein the range of pitch of rotor blades 316 extends from −25 degrees to +41 degrees at 70% of the radius of rotor assembly 310, and the profile of rotor blades 316 is a progressive OAF profile as mentioned above, with a twist decreasing from 17 degrees to 6.9 degrees from 40% to 100% of the radius of rotor assembly 310.

When the first example of ducted thruster 300 is associated with a stator assembly 312 with ten profiled stator vanes 320, to which is added sleeve 390 (ten inter-vane angular separations of 30.66 degrees and one angular separation of 53.4 degrees through which sleeve 390 passes), rotor assembly 310 with eight rotor blades 316 exhibits phase modulation of rotor blades 316 according to the optimal sinusoidal law ($b\Delta\Theta$ min=1.5 radian), of which the parameters are m=2 and $\Delta\Theta$=10.75 degrees, but in order to take account of stator assembly 312, the optimal law is distorted by maximum angular variations of ±3.75 degrees, which leads to the following modulation of the eight rotor blades 316 of rotor assembly 310:

| | | | | n | | | |
|---|---|---|---|---|---|---|---|
| 1 | 2 | 3 | 4 | 5 | 6 | 7 | 8 |
| Θn 55° | 92° | 128° | 180° | 235° | 272° | 308° | 360° |

In contrast, when the first example of ducted thruster 300 is associated with a stator assembly 312 with seven profiled stator vanes 320 plus sleeve 390, rotor assembly 310 with eight rotor blades 316 exhibits phase modulation according to a distorted sinusoidal law (bΔΘ=1.25 radian) of which the parameters are m=2 and ΔΘ=8.96 degrees with maximum angular variations of ±5 degrees, which gives the following modulation:

| | | | | n | | | |
|---|---|---|---|---|---|---|---|
| 1 | 2 | 3 | 4 | 5 | 6 | 7 | 8 |
| Θn 56° | 93° | 131° | 180° | 236° | 273° | 311° | 360° |

The inclination V of stator vanes 320 to the radial direction passing through the base of each of them is about 10 degrees and their angle of slant Ψ towards interior surface 322, and the outlet, of duct 304 is about 4 degrees. The distance 392 separating plane of rotation 342 from the leading edges of stator vanes 320 is approximately 1.53 to 1.66 times chord length 360 of rotor blades 316. Profiled stator vanes 320 have a profile of NACA 65 type with a relative thickness of about 10%, a camber of a mid-line of the profile of about 27 degrees, and an angle of attack setting to central longitudinal axis 306 which is negative and equal to about 2.5 degrees.

In a second example of a ducted thruster 300, rotor assembly 310 includes 10 rotor blades 316. The profile of rotor blades 316 is an OAF profile similar to that of the preceding example, and the range of pitch extends from −25 degrees to +35 degrees at 70% of the radius of rotor assembly 310. Rotor blades 316 exhibit phase or azimuth modulation given by the aforementioned sinusoidal law but distorted (bΔΘ=1 radian) of which the parameters are m=2 and ΔΘ=5.73 degrees with maximum angular variations ±3.4 degrees. Stator assembly 312 includes ten profiled stator vanes 320, to which sleeve 390 is added. This leads to the following modulation:

| | | | | | n | | | | |
|---|---|---|---|---|---|---|---|---|---|
| 1 | 2 | 3 | 4 | 5 | 6 | 7 | 8 | 9 | 10 |
| Θn 44.9° | 77.5° | 102.5° | 135.1° | 180° | 224.9° | 257.5° | 282.5° | 315.1° | 360° |

Angle of slant Ψ of profiled stator vanes 320 is 4 degrees and their inclination V to the radial direction is 7.8 degrees. The distance 392 between plane 342 of rotor assembly 310 and profiled stator vanes 320 is approximately 1.96 times chord length 360 of rotor blades 316. Stator vanes 320 have a profile of NACA 65 type with about 10% relative thickness, with a camber of about 21 degrees for the mid-line of the profile, and an angle of attack setting which is negative and equal to about 2.5 degrees.

In a third example of ducted thruster 300, rotor assembly 310 includes ten rotor blades 316. As in the preceding examples, pitch change axes 340 for rotor blades 316 is at 40% of their chord length 360, and their profile is a progressive OAF profile with the same law of variation in relative thickness, but a twist law which decreases from 7.25 degrees to −1.2 degrees between 40% and 100% of the radius of rotor assembly 310. Stator assembly 312 includes either 13 stator vanes 320, namely 12 profiled stator vanes 320 and sleeve 390, or 17 stator vanes 320, namely 16 profiled stator vanes 320 and sleeve 390. The profile of profiled stator vanes 320 is a profile of NACA 65 type with about 10% relative thickness, a camber of about 23 degrees and an angle of attack setting which is negative and equal to about 2.2 degrees. Angle of slant Ψ of profiled stator vanes 320 is about 3 degrees and their angle V of inclination to the radial direction is about 11.2 degrees. Distance 392 between plane of rotation 342 of rotor assembly 310 and the leading edges of stator vanes 320 is from 1.65 times chord length 360 to 1.7 times chord length 360 and the application of the distorted sinusoidal law mentioned above in order to obtain phase modulation leading to no angle between two arbitrary rotor blades 316 being equal to any angle between two arbitrary stator vanes 320, leads to the angular distribution of rotor blades 316 shown in Table 3 below, depending on whether stator assembly 312 comprises 13 or 17 stator vanes 320.

TABLE 3

| n | Θn stator: 13 | Θn stator: 17 |
|---|---|---|
| 1 | 45.7° | 33.5° |
| 2 | 77° | 77° |
| 3 | 103° | 120.5° |
| 4 | 134.3° | 154° |
| 5 | 180° | 180° |
| 6 | 225.7° | 213.5° |
| 7 | 257° | 257° |
| 8 | 283° | 300.5° |
| 9 | 314.3° | 334° |
| 10 | 360° | 360° |

FIG. 11 represents rotor assembly 310 having the angular distribution indicated in Table 3 above for a stator assembly 312 with 13 stator vanes 320.

FIGS. 16-20 and 35-37 illustrate components and configurations of a ducted thruster 400 for providing forward thrust to an aircraft. Ducted thruster 400, shown in FIG. 16 rotatably coupled to a wing 402, comprises a duct 404 having a central longitudinal axis 406 and a thruster assembly 408 supported within duct 404. Thruster assembly 408 comprises a rotor assembly 410 rotatably coupled about central longitudinal axis 406 within duct 404 and a stator assembly 412 coupled within duct 404 downstream of rotor assembly 410 with respect to a direction of the airflow through duct 404. Rotor assembly 410 comprises a rotor hub 414 and a plurality of variable-pitch rotor blades 416 extending from rotor hub 414. Rotor assembly 410 may include any suitable number of rotor blades 416, e.g., nine rotor blades 416 as shown in the figures. Stator assembly 412 comprises a stator hub 418 and a plurality of stator vanes 420 extending from stator hub 418 to an interior surface 422 of duct 404. Stator assembly 412 may include any suitable number of stator vanes 420, e.g., equal to or unequal to the number of rotor blades 416.

Figure 17:
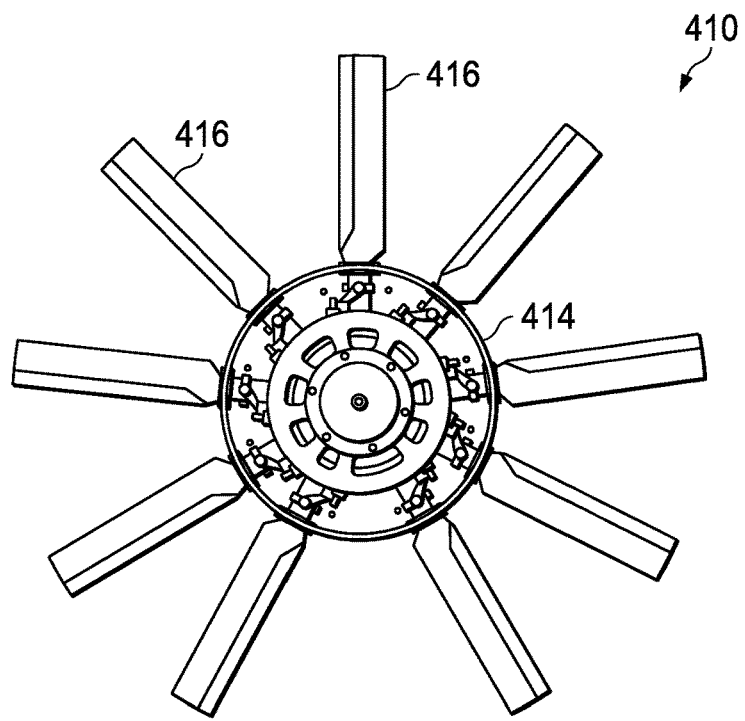
FIG. 17 is a front view of a rotor assembly of the ducted thruster of FIG. 16.
Figure 18:
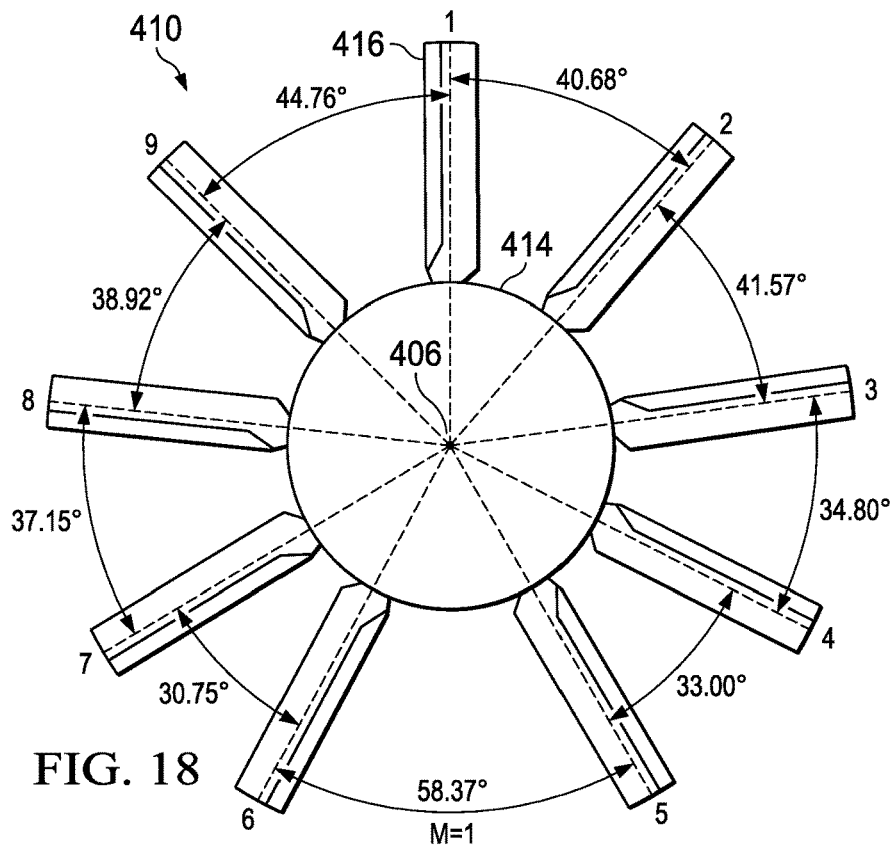
FIG. 18 is a front view of the rotor assembly of the ducted thruster of FIG. 16.
Figure 19:
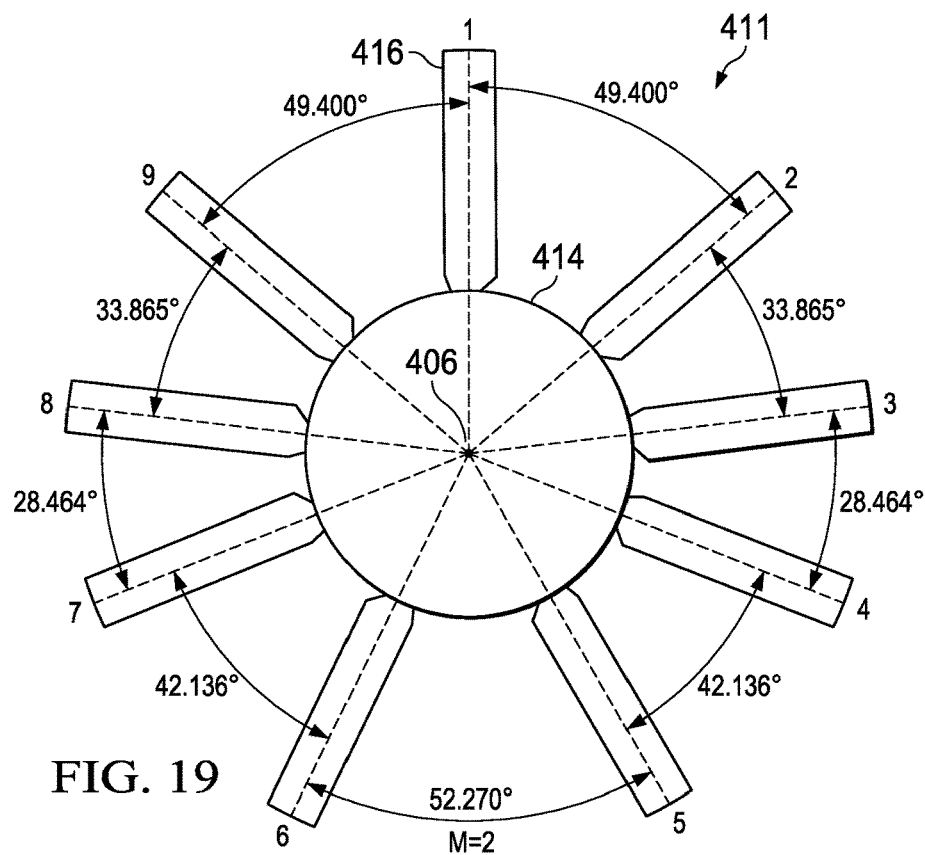
FIG. 19 is a front view of another rotor assembly, according to this disclosure.

As shown in FIGS. 17-19, rotor blades 416 are modulated around central longitudinal axis 406 such that angles between adjacent rotor blades 416 are varied to create a balanced rotor assembly 410 while decreasing noise. FIGS. 17 and 18 illustrate a rotor assembly 410 with modulation factor m, as discussed below, of m=1, with FIG. 18 illustrating the optimized angle in degrees between each rotor blade 416. FIG. 20 provides a list of the angular spacing between each rotor blade 416 in FIGS. 17 and 18 under the column labeled "m=1." FIG. 19 illustrates a rotor assembly 411 with modulation factor m, as discussed below, of m=2, illustrating the optimized angle in degrees between each rotor blade 416. FIG. 20 provides a list of the angular spacing between each rotor blade 416 shown in FIG. 19 under the column labeled "m=2."

Modulated rotor blade spacing reduces the amplitude of the fundamental frequency of a rotor and harmonics of that frequency and shifts the energy to other frequencies normally not substantially present. These new tones that are generated tend to be masked by other noise sources and make the resulting sound more broadband, rather than tonal, in quality. Furthermore, the blade spacing method of this disclosure can enable a dynamically balanced rotor to be developed without a modulation factor being a prime with respect to the number of rotor blades. That is, the blade modulation factor and the number of rotor blades can be such that the two numbers have no common divisor except unity. In other words, the blade modulation does not have to divide evenly into the number of rotor blades. A lower modulation factor results in a more random, or broadband, sound. The use of a non-prime modulation factor can lead to blade spacing angles that are difficult to manufacture, so an optimization technique is used to slightly change the blade angles to that which can be manufactured while keeping the rotor system balanced. Thus, the blade modulation reduces the amplitude of the fundamental tone of the rotor assembly and increases the broadband randomness of the sound, while at the same time enables dynamic balancing of the rotor assembly.

An embodiment of this disclosure includes a method of achieving a balanced rotor assembly with modulated rotor blades regardless of whether the modulation factor m is prime with the number of rotor blades and including when the modulation factor m is prime with the number of rotor blades. Additionally, the method of the subject application permits the use of low modulation factors, such as modulation factor m=1 and modulation factor m=2, since a lower modulation factor m can result in a more random, or broadband sound.

For an embodiment of this disclosure, the angular spacing of rotor blades 416 is determined by using the sinusoidal law:

$$\Theta_i' = \Theta_i + \Delta\Theta_i \sin(m\Theta_i)$$

where $\Theta_i'$ is the modulated blade angle for the ith rotor blade 416; $\Theta_i$ is the nominal blade angle for the ith rotor blade 416; $\Delta\Theta_i$ is the maximum modulation amplitude or the maximum blade angle change; and m is the modulation factor (1, 2, 3, . . . , where 1=1 cycle of modulation from 0 to 2π, 2=2 cycles of modulation from 0 to 2π, etc.). Additionally, the subject embodiment utilizes the equation:

$$\Delta\Theta_i = \Delta\Phi/I$$

wherein I is number of rotor blades 416.

Further, $\Delta\Theta_i$ and, thus, $\Delta\Phi$ are not constant in the sinusoidal law used in the subject embodiment. In the subject embodiment the disclosed method is utilized for balancing a modulated rotor assembly with a modulation factor m that is prime with the number of rotor blades 416. That is, one embodiment of this disclosure includes balancing a nine rotor-blade rotor assembly with a modulation factor m of m=1. Another embodiment of this disclosure includes balancing a nine rotor-blade rotor assembly with a modulation factor m of m=2.

To accomplish modulating rotor assemblies 410 and 411 with odd numbers of rotor blades 416 and with the desired modulation factors of m=1 and m=2 to form balanced rotor assemblies 410 and 411, $\Delta\Phi$ is varied so that more harmonics ($J_2$, $J_3$, etc.) will be more even in amplitude, and near perfect balance is attainted. Thus, an iterative optimization is used with the sinusoidal law. That is, the sinusoidal law is modified such that $\Delta\Theta$ is replaced with $\Delta\Theta_i$ for each harmonic and an additional restriction of balance given by the sum of sin $\Theta$ and cos $\Theta$ is added to an objective function. The objective function for determining the modulation factor m=1 for rotor assembly 410 minimizes the following sum: (blade weighting)×(blade balance sum)+(Bessel weighting)×(Bessel values) subject to the minimum blade angle between rotor blades 416. In the illustrated embodiment, the blade weighting was arbitrarily chosen to be 100 and the Bessel weighting was arbitrarily chosen to be 20. The minimum angle was arbitrarily chosen at 10 degrees but was later changed to 30, and then to 29. The exact values of $\Delta\Phi$ can be approximated graphically from a plot of the Bessel functions. The values of $\Delta\Phi$ typically varied from 0 to 13. One constraint placed on the optimization routine was that a rotor blade 416 was not modulated so that the rotor blade 416 switches order. Also, increasing the revolutions per minute (RPM) of rotor assembly 410 improved the balance of rotor assembly 410. As an end result, the methodology of this embodiment of this disclosure, that is, a modified sinusoidal law, leads to a substantially balanced rotor assembly 410 regardless of whether the modulation factor is prime with the number of rotor blades 416.

To accomplish the modulating of rotor assembly 411 with a modulation factor of m=2, a process similar to that used for determining the modulation of rotor assembly 410 for modulation factor m=1 is used, but for modulating rotor assembly 411 with a modulation factor of m=2 the evenness of the Bessel functions was not weighed into the equation.

For both cases of modulation factors m=1 and m=2, rotor assemblies 410 and 411 were not perfectly balanced using the sinusoidal law. It is necessary to further vary the modulated angles to achieve a theoretical balance more perfect than manufacturing error. It is not preferable to manufacture rotor hub 414 to a greater tolerance than two decimal places, so in a spreadsheet numerical routine (any numerical method can be used, with the objective function to minimize balance error minus the sum of the sines and cosines as discussed in column 11 of U.S. Pat. No. 5,588,618) each iteration was rounded off to two decimal places so that the balanced rotor is within manufacturing tolerances, that is, the manufacturing tolerance errors are greater than the theoretically balanced error for the two decimal places specified.

Thus, through the above-described methodology, in the illustrated embodiment, a nine bladed modulated rotor assembly 410 and 411 can be essentially balanced with a modulation factor m=1 and with a modulation factor of m=2.

Although the illustrated embodiment addresses the balancing of rotor assemblies 410 and 411 with nine rotor blades 416, it should be understood that rotor assemblies 410 and 411 having any desired number of rotor blades can be balanced using the methodology of this disclosure, including a prime number of rotor blades 416. For example, a rotor assembly 410 with seven rotor blades 416 or with eleven rotor blades 416 can be balanced.

One preferred modulated spacing of rotor blades 416 for rotor assembly 410 (m=1) is determined as set forth above and illustrated in FIGS. 17 and 18 and listed in FIG. 20 under the column "m=1." One preferred modulated spacing of rotor blades 416 for rotor assembly 411 (m=2) is determined as set forth above and illustrated in FIG. 19 and listed in FIG. 20 under the column "m=2."

FIGS. 21-28, 33, and 34 illustrate components and configurations of a ducted thruster 500 for providing forward thrust to an aircraft. Ducted thruster 500, comprises a duct 504 having a central longitudinal axis 506 and a thruster assembly 508 supported within duct 504. Thruster assembly 508 comprises a rotor assembly 510 rotatably coupled about central longitudinal axis 506 within duct 504 and a stator assembly 512 coupled within duct 504 downstream of rotor assembly 510 with respect to a direction of the airflow through duct 504. Rotor assembly 510 comprises a rotor hub 514 and a plurality of variable-pitch rotor blades 516 extending from rotor hub 514. Rotor assembly 510 may include any suitable number of rotor blades 516, e.g., eight rotor blades 516 as shown in the figures. Stator assembly 512 comprises a stator hub 518 and a plurality of stator vanes 520 extending from stator hub 518 to an interior surface 522 of duct 504. Stator assembly 512 may include any suitable number of stator vanes 520, e.g., equal to or unequal to the number of rotor blades 516.

To reduce the perceived noise of ducted thruster 500 during operation and to improve performance of ducted thruster 500, stator vanes 520 of stator assembly 512 are angularly modulated around stator hub 518. That is, the angular separation between each of stator vanes 520 is not constant, but instead is varied. Stator vanes 520 are modulated such that only a portion of a rotor blade 516 intersects a portion of a stator vane 520 at any given time when a rotor blade 516 rotates around central longitudinal axis 506 and moves past each stator vane 520. That is, a full rotor blade 516 does not overlap a full stator vane 520 at any given time. Moreover, the intersection points between rotor blades 520 and the respective stator vanes 520 at any given time each have a different radial length from central longitudinal axis 506. Thus, the angular modulation of stator vanes 520 ensures that no two rotor blades 516 pass over the same portion of a stator vane 520 at the same time. By varying the points at which rotor blades 516 intersect respective stator vanes 520 at any given time, the noise generated at each of the intersections is diversified so as to reduce the perceived noise level of ducted thruster 500. Modulated stator vanes 520 may be integrated into any suitable ducted thruster.

FIGS. 21, 22, and 24-28 show schematic representations of rotor blades 516 and stator vanes 520 to illustrate the relative relationships between rotor blades 516 and stator vanes 520. FIGS. 21, 22, and 24-28 show representations of rotor blades 516 and stator vanes 520 as seen from the stator-side of ducted thruster 500. That is, FIGS. 21, 22, and 24-28 illustrate rotor blades 516 and stator vanes 520 from the downstream side of duct 504 looking upstream. FIG. 23 is an isolated view of stator vanes 520 from the rotor-side of ducted thruster 500.

Figure 21:
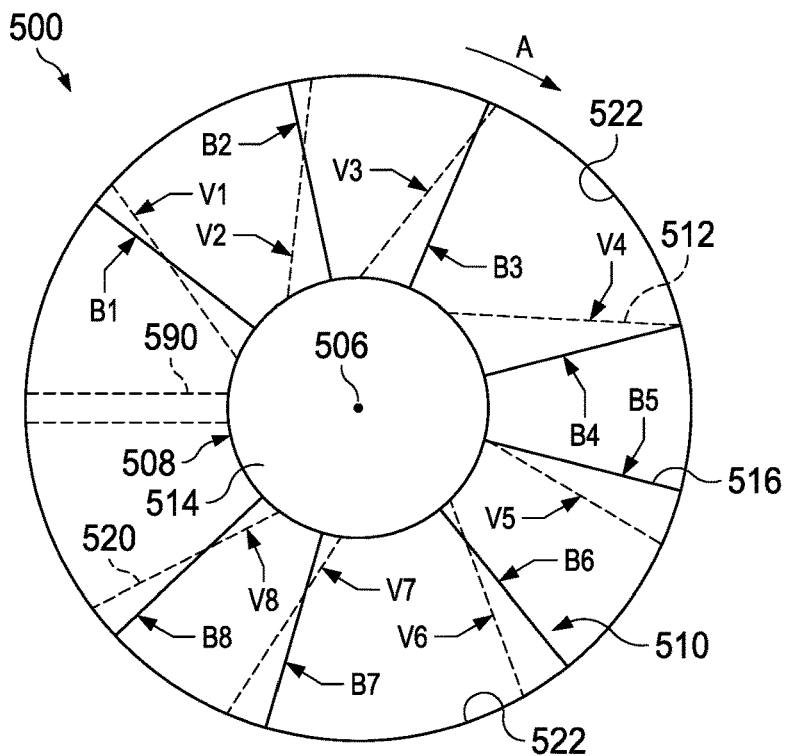
FIG. 21 is a schematic front view of a thruster assembly, according to this disclosure, showing centerlines of rotor blades as solid lines and centerlines of stator vanes as dashed lines.
Figure 22:
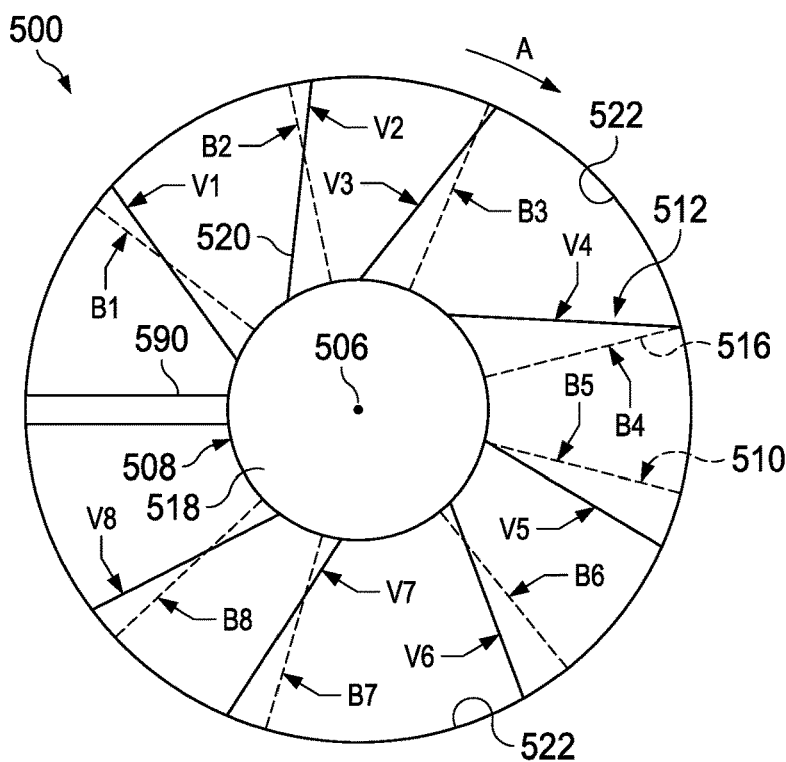
FIG. 22 is a schematic front view of the thruster assembly of FIG. 21, showing the centerlines of the rotor blades as dashed lines and the centerlines of the stator vanes as solid lines.
Figure 23:
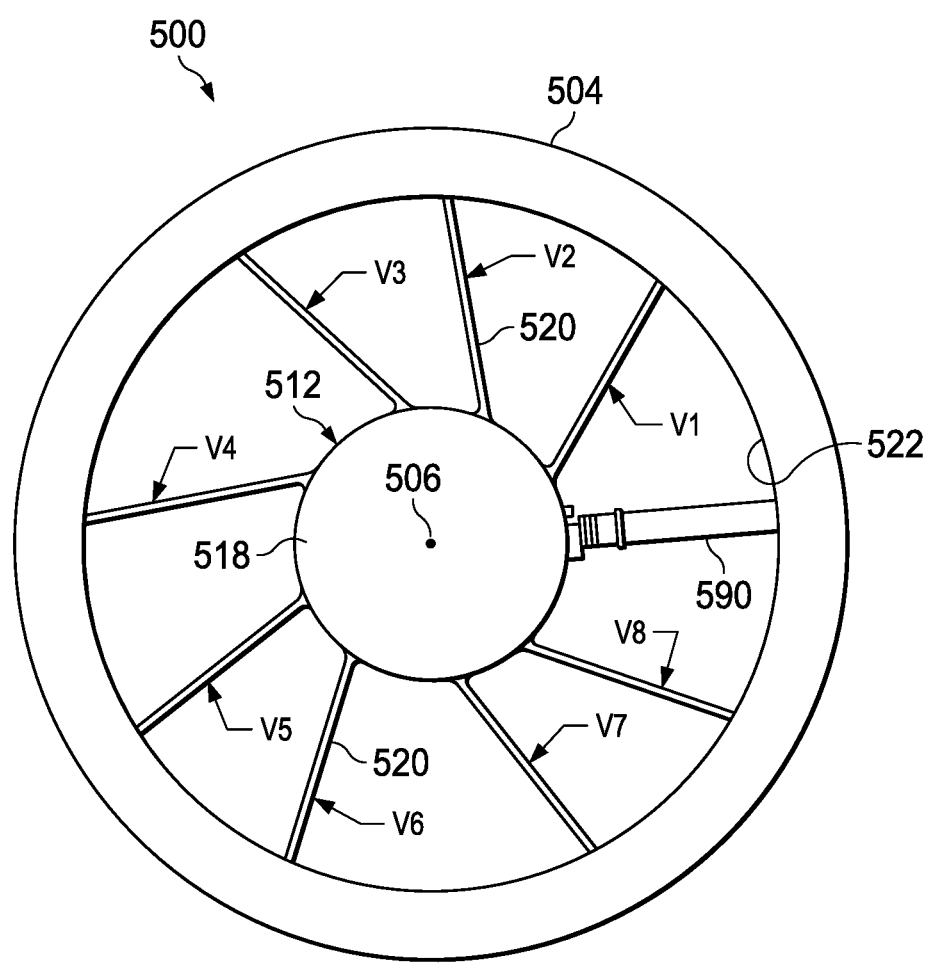
FIG. 23 is a rear view of a stator assembly of the thruster assembly of FIG. 21.
Figure 24:
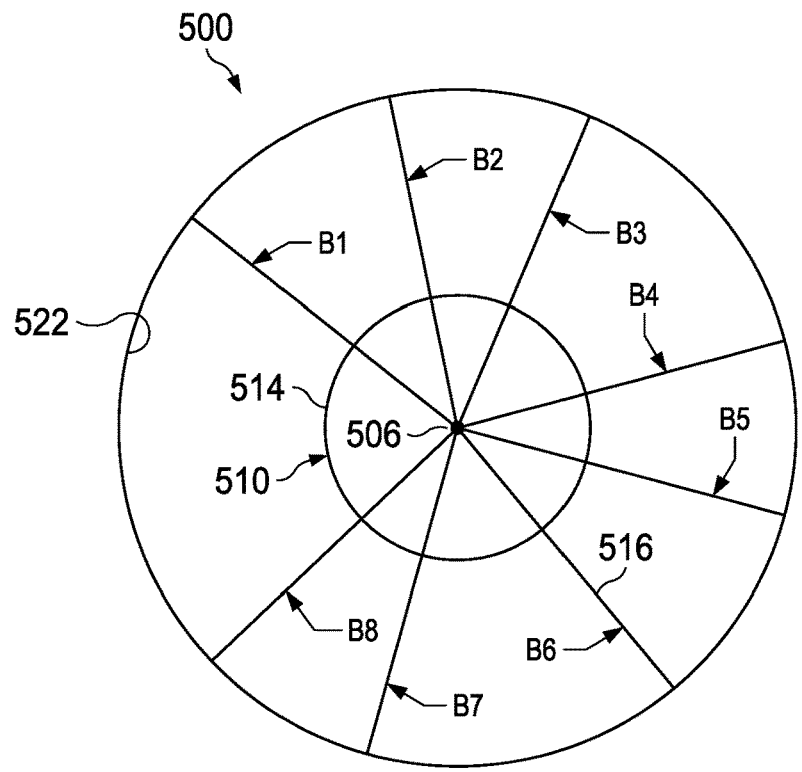
FIG. 24 is a schematic front view of the centerlines of the rotor blades of FIG. 21.

FIGS. 21 and 22 schematically illustrate rotor blades 516 intersecting stator vanes 520. Specifically, FIGS. 21 and 22 illustrate rotor blade centerlines of rotor blades 516 intersecting with stator vane centerlines of modulated stator vanes 520 (FIG. 21 illustrates the rotor blade centerlines in solid lines and the stator vane centerlines in dashed lines, whereas FIG. 22 illustrates the stator vane centerlines in solid lines and the rotor blade centerlines in dashed lines). As best shown in FIG. 21, rotor assembly 510 includes eight rotor blades 516, hence eight rotor blade centerlines are successively labeled as B1 to B8. However, rotor assembly 510 may include any other suitable number of rotor blades 516, e.g., nine rotor blades 516. Also, in the illustrated embodiment, rotor blades 516 are modulated about rotor hub 514. That is, the intersection angle between adjacent rotor blade centerlines B1 to B8 is varied or non-uniform. However, rotor assembly 510 may include rotor blades 516 that are un-modulated (equally or uniformly distributed) around rotor hub 514. Moreover, as shown in FIG. 24, rotor blades 516 extend radially. That is, each of rotor blade centerlines B1 to B8 are radial and pass through central longitudinal axis 506. However, rotor assembly 510 may include rotor blades 516 that are non-radial. When operated, rotor blades 516 rotate clockwise in the direction of arrow A (as viewed in FIGS. 21 and 22).

As best shown in FIGS. 22 and 23, stator assembly 512 includes eight stator vanes 520, hence eight stator vane centerlines successively labeled as V1 to V8. However, stator assembly 512 may include any other suitable number of stator vanes 520. A driveshaft 590 powering rotor assembly 510 extends from interior surface 522 of duct 504 to stator hub 518 between stator vanes V1 and V8. Driveshaft 590 is drivingly engaged with rotor assembly 510 to operate the same. Driveshaft 590 extends from the aircraft toward central longitudinal axis 506 to drive rotor assembly 510.

Figure 25:
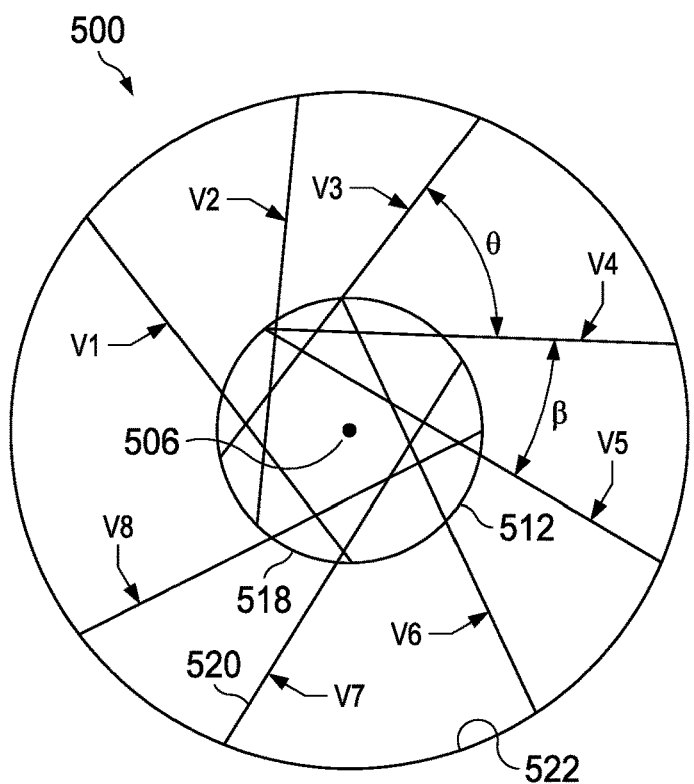
FIG. 25 is a schematic front view of the centerlines of the stator vanes of FIG. 21.

As best shown in FIGS. 22 and 23, stator vanes 520 are modulated in the same direction about stator hub 518. Specifically, stator vanes 520 are inclined with respect to rotor blades 516 in the clockwise direction, in the direction of rotation A of rotor assembly 510. Thus, stator vane centerlines V1 to V8 are inclined relative to rotor blade centerlines B1 to B8, and a full stator vane centerline V1-V8 will not overlap a full rotor blade centerline B1-B8 at any given time. Moreover, the modulation angle between adjacent stator vane centerlines V1-V8 is varied or non-uniform. For example, as shown in FIG. 25, the angle Θ between V3 and V4 is different than the angle β between V4 and V5.

Additionally, stator vanes 520 are non-radial. As shown in FIG. 25, each of stator vane centerlines V1-V8 passes through circular stator hub 518, but not through central longitudinal axis 506. Specifically, each stator vane centerline V1-V8 is tangent to a respective circle having central longitudinal axis 506 as its axis. Thus, the modulation angles between stator vane centerlines V1-V8 are continuously varied so that stator vane centerlines V1-V8 do not have a radial configuration about central longitudinal axis 506 as do rotor blade centerlines B1-B8.

Figure 26:
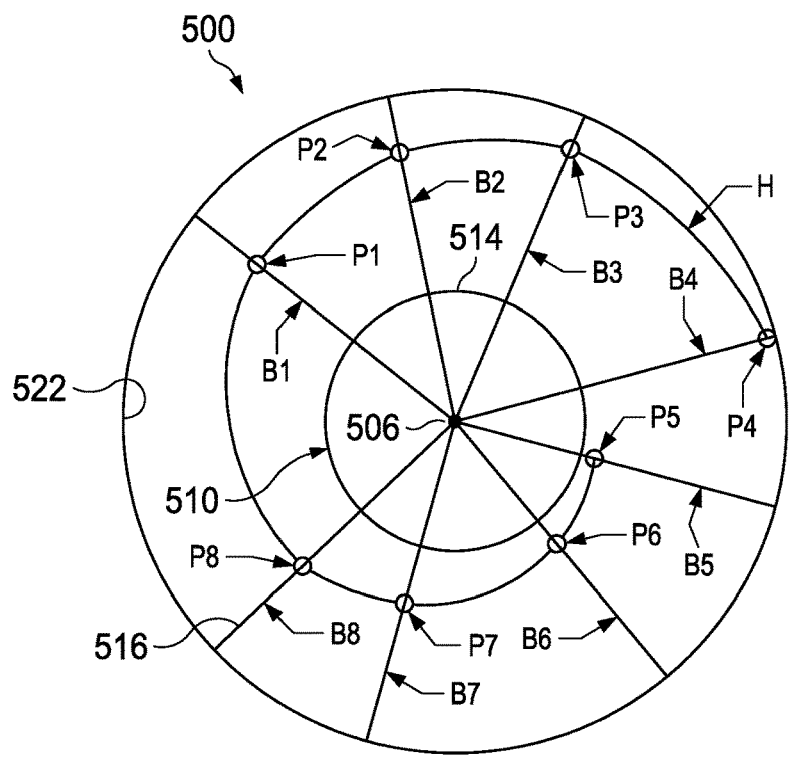
FIG. 26 is a schematic front view of the centerlines of the rotor blades of FIG. 21 showing intersection points with a helix.

The modulation angles are a function of the circumferential position of each stator vane 520, which is a function of rotor blade 516 distribution. That is, the orientation of each stator vane 520 is based on rotor blade 516 distribution. To determine stator vane 520 modulation, a point is selected along each of rotor blade centerlines B1-B8, as shown in FIG. 26. Thus, eight points are selected and successively labeled as P1 to P8. Points P1-P8 are selected such that a line connecting the points forms an imaginary helix H. This arrangement positions eight points P1-P8 such that each of eight points P1-P8 has a different radial length from central longitudinal axis 506. For example, P5 is closer to central longitudinal axis 506 than P6, and P6 is closer to central longitudinal axis 506 than P7, etc. The positioning of eight points P1-P8 may be determined in any suitable manner, e.g., mathematical modeling, experimenting, etc.

Figure 27:
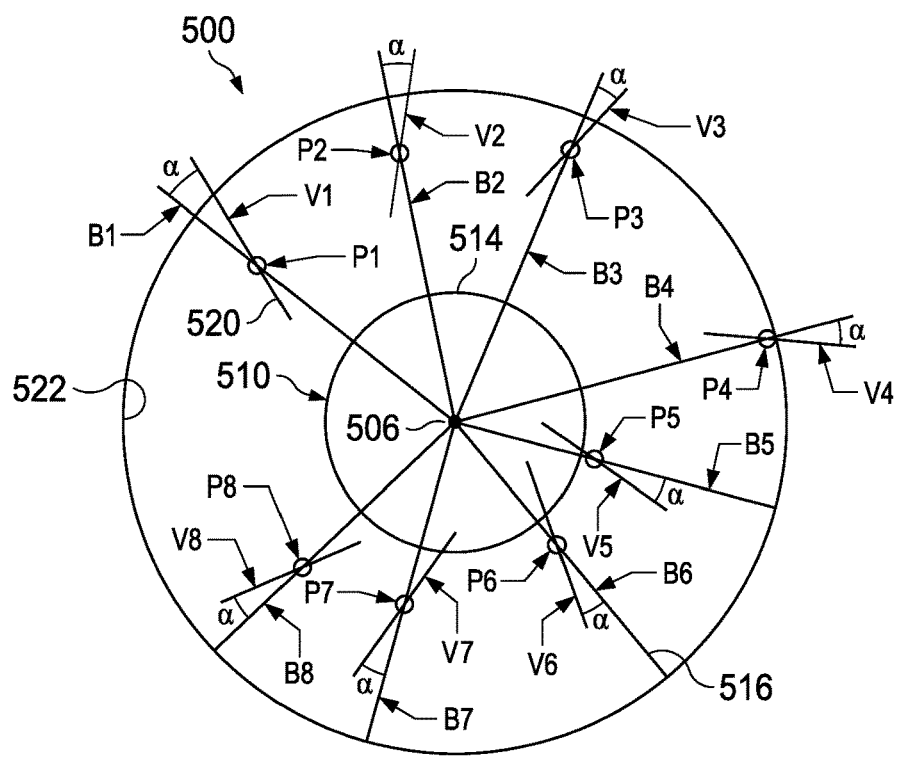
FIG. 27 is a schematic front view of the centerlines of the rotor blades of FIG. 21 showing intersection points with the centerlines of the stator vanes.

Then, as shown in FIG. 27, an inclined line is passed through each of points P1-P8 on rotor blade centerlines B1-B8. The lines are inclined in the same direction, i.e., in the direction of rotation A of rotor assembly 510. These lines define stator vane centerlines V1-V8 of stator vanes 520. As illustrated, intersection angles α between stator vane centerlines V1-V8 and respective rotor blade centerlines B1-B8 are equal. The angle α is approximately 17 degrees. However, the angle may have any suitable and appropriate magnitude, and the magnitude may be determined in any suitable manner, e.g., mathematical modeling, experimenting, etc.

Thus, when rotor assembly 510 is operated, rotor blades 516 intersect with respective stator vanes 520 at about a 17-degree angle, but the point of intersection between each rotor blade 516 and respective stator vane 520 is at a different radial length from central longitudinal axis 506. By changing how each rotor blade 516 crosses a respective stator blade 520, the sound generated from the crossing is diversified and not symmetric. For example, the sound generated when B1 crosses V1 will be different from the sound generated when B2 crosses V2, and the sound generated when B2 crosses V2 will be different from the sound generated when B3 crosses V3. The range of sounds reduces the perceived noise generated by ducted thruster 500 during operation.

The arrangement of stator assembly 512 described above places each of stator vanes 520 in tension when rotor assembly 510 is operating due to the torque created by the rotation of rotor assembly 510 wherein the torque is in the direction opposite to the direction of rotation of rotor assembly 510.

Figure 28:
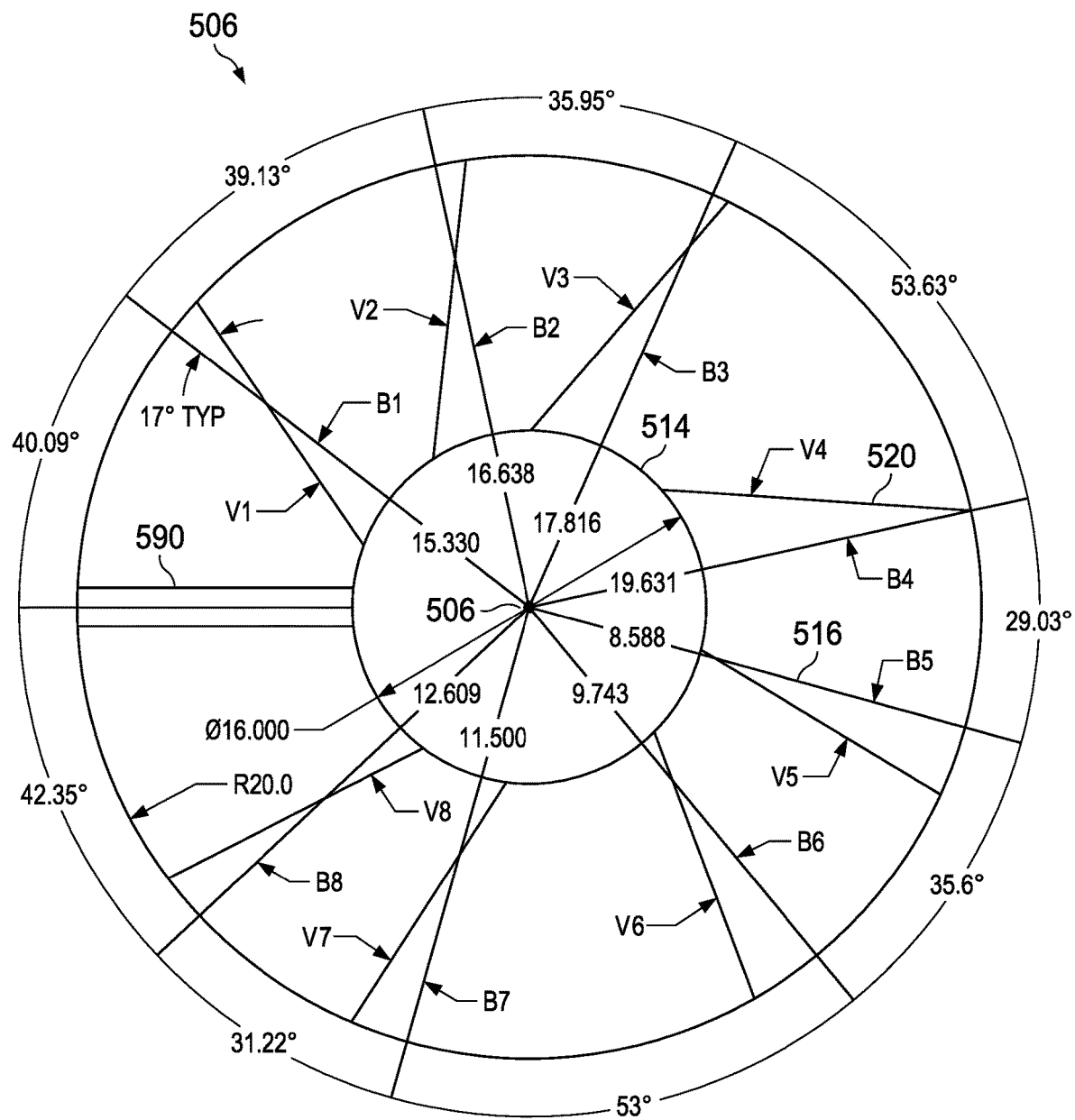
FIG. 28 is a schematic front view of another thruster assembly, according to this disclosure, showing centerlines of rotor blades and centerlines of stator vanes as solid lines.

FIG. 28 illustrates possible dimensions of the elements discussed with respect to FIGS. 21-27. It should be understood that the dimensions in FIG. 28 are only one example of the dimensions and proportions of the various elements illustrated.

Figure 29:
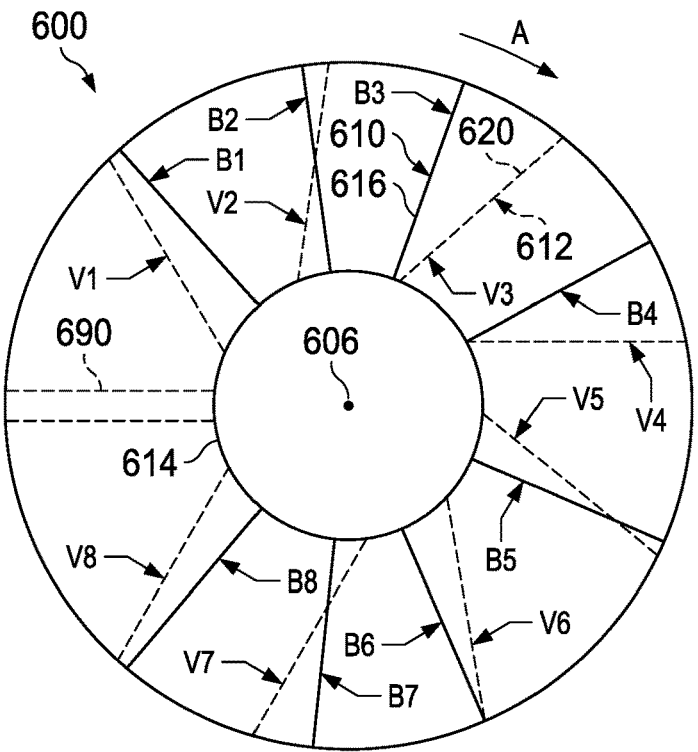
FIG. 29 is a schematic front view of another thruster assembly, according to this disclosure, showing centerlines of rotor blades as solid lines and centerlines of stator vanes as dashed lines.
Figure 30:
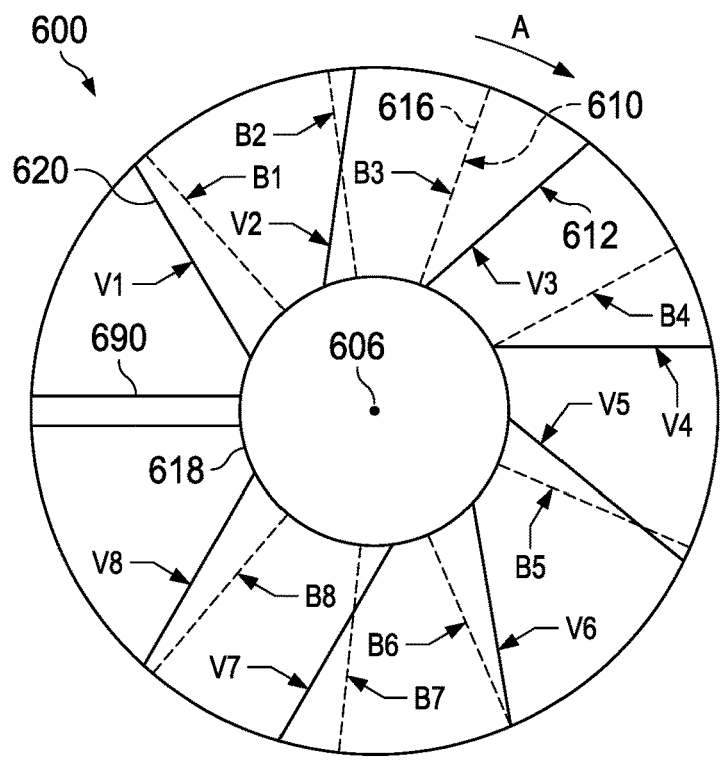
FIG. 30 is a schematic front view of the thruster assembly of FIG. 29, showing centerlines of rotor blades as dashed lines and centerlines of stator vanes as solid lines.

FIGS. 29 and 30 illustrate configurations of a ducted thruster 600 for providing forward thrust. Ducted thruster 600 comprises a duct having a central longitudinal axis 606 and a thruster assembly supported within the duct. The thruster assembly comprises a rotor assembly 610 rotatably coupled about central longitudinal axis 606 within the duct and a stator assembly 612 coupled within the duct downstream of rotor assembly 610 with respect to a direction of the airflow through the duct. Rotor assembly 610 comprises a rotor hub 614 and a plurality of variable-pitch rotor blades 616 extending from rotor hub 614. Rotor assembly 610 may include any suitable number of rotor blades 616, e.g., eight rotor blades 616 as shown in the figures. Stator assembly 612 comprises a stator hub 618 and a plurality of stator vanes 620 extending from stator hub 618 to an interior surface of the duct. Stator assembly 612 may include any suitable number of stator vanes 620, e.g., equal to or unequal to the number of rotor blades 616.

FIGS. 29 and 30 schematically illustrate modulated stator vanes 620. In this embodiment, one of stator vanes 620 (each stator vane 620 and rotor blade 616 being represented by a center line) near a driveshaft 690, e.g., V8, is oppositely inclined with respect to remaining stator vanes V1-V7. Specifically, V8 is inclined with respect to rotor blades B1-B8 in the opposite direction of rotation A of rotor assembly 610.

This arrangement of stator assembly 612 places one stator vane V8 in compression and the remaining stator vanes V1-V7 in tension when rotor assembly 610 is operating. Moreover, this arrangement enables the two stator vanes V1 and V8 closest to driveshaft 690 to be mounted close to areas of high stress, which leads to better stress flow, reduced weight, and improved structural integrity. Additionally, more than one of stator vanes V1-V8 may be oppositely inclined.

It should be understood that illustrated stator assemblies 512 and 612 are only exemplary, and stator assemblies 512 and 612 may include stator vanes 520 and 620 modulated in any suitable manner to reduce the perceived sound of ducted thrusters 500 and 600, respectively, and to improve structural integrity. Moreover, it should be understood that the determination of the stator vane modulation described above is only exemplary, and the stator vane modulation may be determined in any other suitable manner.

Figure 31:
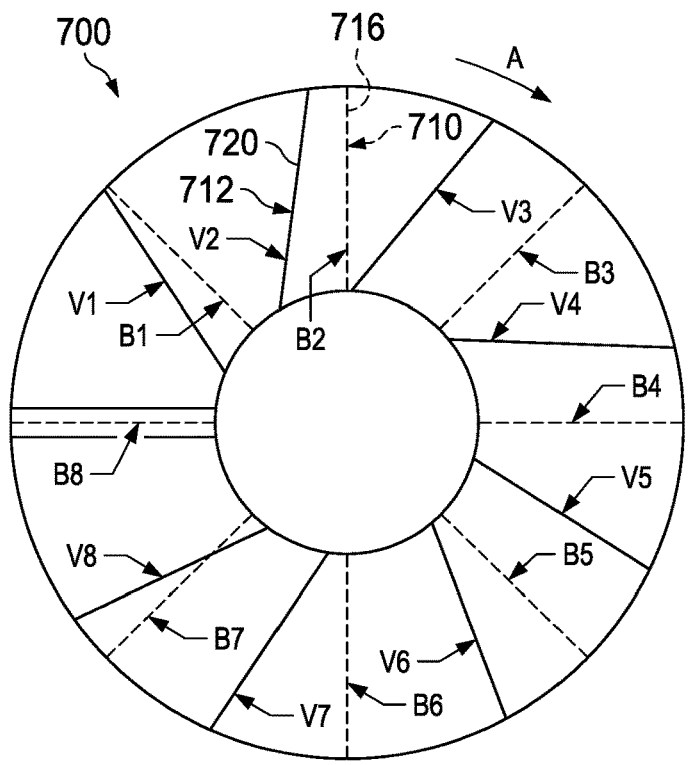
FIG. 31 is a schematic front view of another thruster assembly, according to this disclosure, showing centerlines of rotor blades as dashed lines and centerlines of stator vanes as solid lines.
Figure 32:
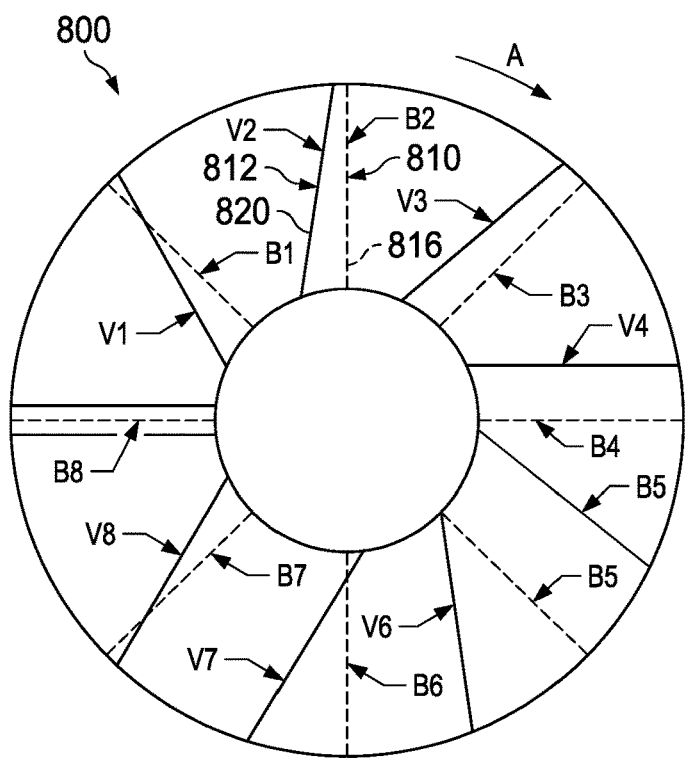
FIG. 32 is a schematic front view of another thruster assembly, according to this disclosure, showing centerlines of rotor blades as dashed lines and centerlines of stator vanes as solid lines.

Modulated stator vanes may be utilized with any suitable rotor assembly, including a rotor assembly with modulated rotor blades or a rotor assembly with un-modulated rotor blades. A rotor assembly with un-modulated rotor blades refers to a rotor assembly in which the angular spacing between adjacent rotor blades is constant. That is, the rotor blades are evenly spaced around the rotor hub such that the angle between every pair of adjacent rotor blades is the same. For example, FIG. 31 illustrates a ducted thruster 700, wherein rotor blades 716 of a rotor assembly 710 are un-modulated and stator vanes 720 of a stator assembly 712 are modulated similar to FIGS. 22 and 23 and are substantially identical to the stator vanes discussed above with respect to similar to FIGS. 22 and 23. FIG. 32 illustrates a ducted thruster 800, wherein rotor blades 816 of a rotor assembly 810 are un-modulated and stator vanes 820 of a stator assembly 812 are modulated similar to FIG. 30 and are substantially identical to stator vanes 620 discussed above with respect to FIG. 30.

Also, in an embodiment, one of the angles between adjacent rotor blades may be equal to one of the angles between adjacent stator vanes. In one example, one of the angles between adjacent rotor blades of an un-modulated rotor assembly may be equal to one of the angles between adjacent stator vanes of a modulated stator assembly. In another example, one of the angles between adjacent rotor blades of a modulated rotor assembly may be equal to one of the angles between adjacent stator vanes of a modulated stator assembly.

Figure 33:
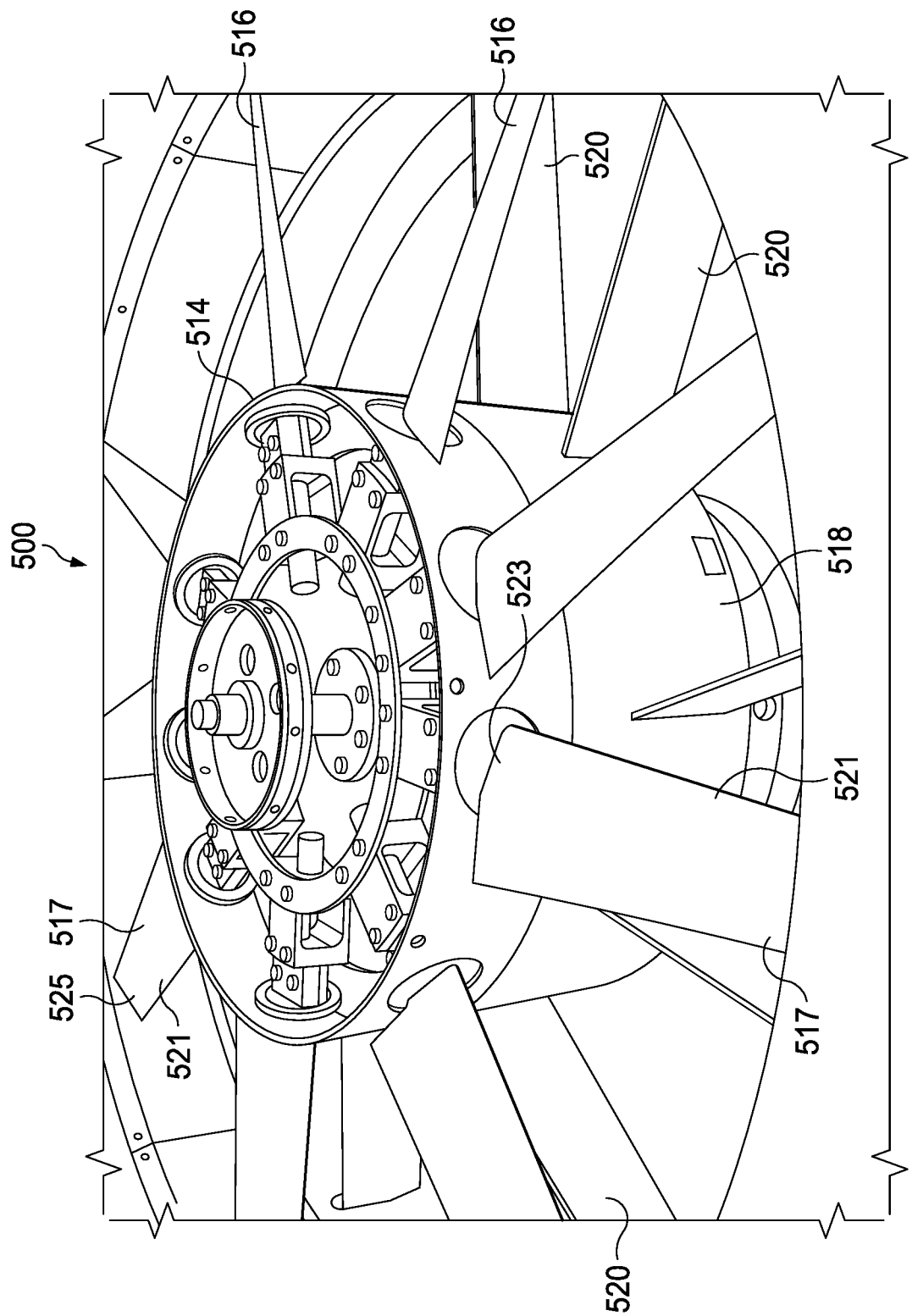
FIG. 33 is an oblique view of another ducted thruster, according to this disclosure.

FIG. 33 illustrates rotor assembly 510 having substantially non-rectangular planform shaped rotor blades 516. Rotor blades 516 disclosed may have a scimitar planform shape, or they may have a tapered planform shape (see rotor blades 516 in FIG. 33). The rotor blades may be constructed from any suitable material and may be constructed in any suitable manner.

The scimitar planform shaped rotor blade is formed like a saber having a curved blade. Specifically, the scimitar planform shaped rotor blade has a leading edge that faces the direction of rotation of the rotor assembly, and a trailing edge. The leading edge has a generally convex configuration, and the trailing edge has a slightly concave configuration. However, the trailing edge may be generally parallel with a longitudinally extending centerline of the rotor blade or may have any other suitable configuration. Also, a proximal edge of the rotor blade, adjacent the rotor hub, and a distal edge of the rotor blade are both generally perpendicular to the rotor blade centerline. However, these edges may have any other suitable configuration, e.g., inclined, curved. Thus, the edges of the rotor blade cooperate to form a substantially non-rectangular planform shape. In use, this shape helps to reduce the Mach compressibility effects and perceived noise while maintaining performance. Specifically, this substantially non-rectangular planform shape of the rotor blade keeps a length of the rotor blade from crossing a length of a stator vane at any given time during operation.

Moreover, a cross-sectional configuration of the scimitar planform shaped rotor blade varies along the length thereof. The various cross-sections may have different configurations from one another, and the configurations may be solid, hollow, multiple-layered, etc. Also, the rotor blade has a twisted configuration. The twist of the rotor blade increases along a first portion of the length, then the twist slightly decreases along a second portion of the length. Also, a chord length of the rotor blade increases and then sharply decreases along length thereof. This variation in chord length gives the rotor blade its scimitar planform shape.

Figure 34:
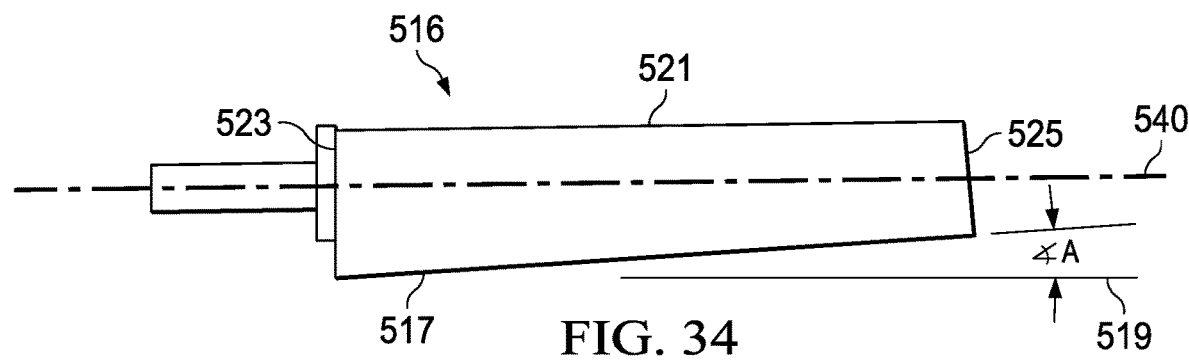
FIG. 34 is a front view of a rotor blade, according to this disclosure.

FIGS. 33 and 34 illustrate tapered rotor blade 516 having a tapered planform shape. Specifically, a trailing edge 517 of each of rotor blades 516 is inclined towards a pitch-change axis 540 of rotor blade 516. As illustrated in FIG. 34, trailing edge 517 is inclined relative to a line 519 that is substantially parallel to pitch-change axis 540 by an angle A. A leading edge 521 is substantially parallel with respect to pitch-change axis 540. However, leading edge 521 and trailing edge 517 may have other suitable configuration, e.g., inclining leading edge 521 relative to pitch-change axis 540 along with inclined trailing edge 517 or by itself instead of inclined trailing edge 517. Also, a proximal edge 523 of rotor blade 516 and a distal edge 525 of rotor blade 516 are both generally perpendicular to pitch-change axis 540. However, edges 523 and 525 may have any other suitable configuration, e.g., inclined. Thus, edges 517, 521, 523, and 525 of rotor blade 516 cooperate to form a substantially non-rectangular planform shape. When rotor assembly 510 is operated, rotor blades 516 intersect with respective stator vanes 520 at an incline. By changing how each rotor blade 516 crosses a respective stator vane 520, the perceived noise generated by ducted thruster 500 is reduced during operation.

It is contemplated that stator vanes 520 may have a substantially non-rectangular planform shape, e.g., scimitar, tapered. In such construction, rotor blades 516 of rotor assembly 510 may have a rectangular planform shape. In use, rotor blades 516 and stator vanes 520 would intersect one another at an incline to provide the noise reducing benefit.

It should be understood that illustrated rotor assembly 510 is only exemplary, and rotor assembly 510 may include rotor blades 516 with any other suitable substantially non-rectangular planform shape so as to reduce the perceived sound of ducted thruster 500 and to improve aerodynamic performance of ducted thruster 500.

Figure 35:
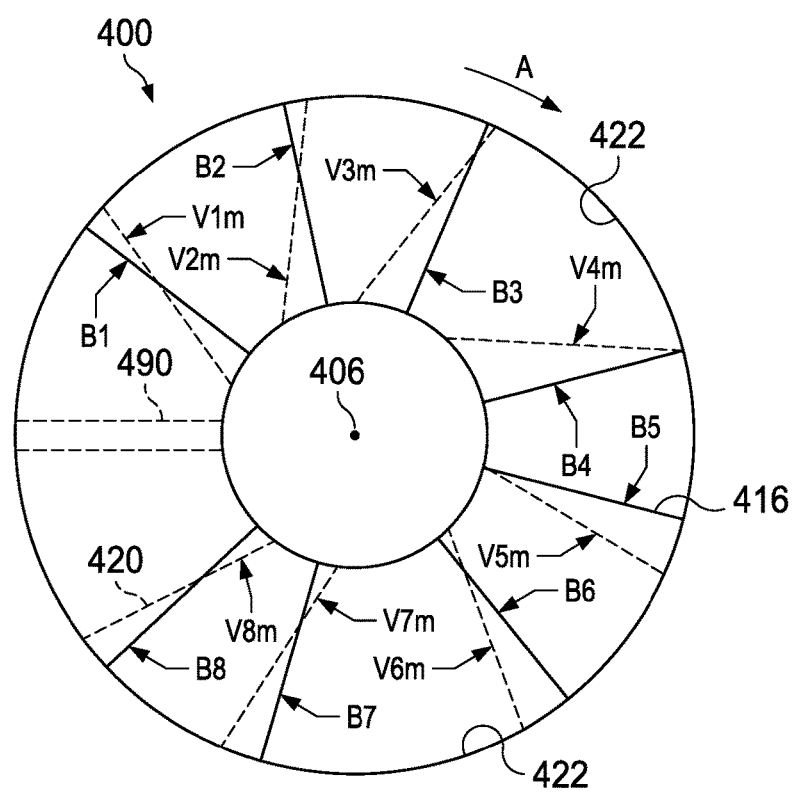
FIG. 35 is a schematic front view of another thruster assembly, according to this disclosure, showing centerlines of rotor blades as solid lines and centerlines of stator vanes as dashed lines.
Figure 36:
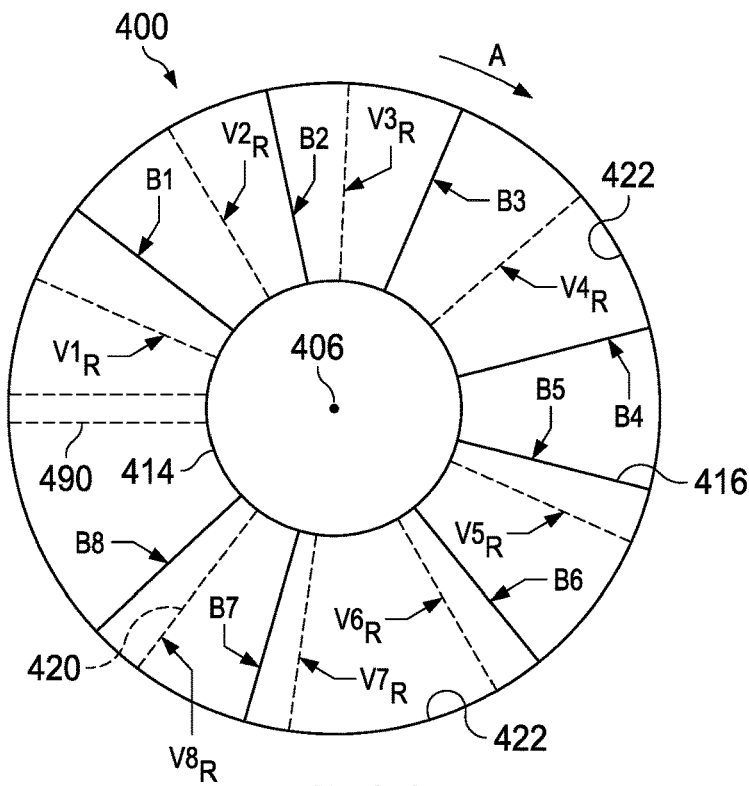
FIG. 36 is a schematic front view of another thruster assembly, according to this disclosure, showing centerlines of rotor blades as solid lines and centerlines of stator vanes as dashed lines.

FIG. 35 schematically illustrates rotor blades 416 intersecting with modulated stator vanes 420. Specifically, FIG. 35 illustrates rotor blade centerlines of rotor blades 416 intersecting with stator vane centerlines of modulated stator vanes 520 (FIGS. 35 and 36 illustrate the rotor blade centerlines in solid lines and the stator vane centerlines in dashed lines). Rotor assembly 510 includes eight rotor blades 416, hence eight rotor blade centerlines are successively labeled as B1 to B8. Rotor assembly 410 may include any other suitable number of rotor blades 416, e.g., nine rotor blades 416. Also, rotor blades 416 are modulated about rotor hub 414. That is, the intersection angle between adjacent rotor blade centerlines B1 to B8 is varied, or non-uniform. Because the angles between each rotor blade centerline B1-B8 varies, rotor blades 416 are angularly modulated. However, rotor assembly 410 may include rotor blades 416 that are equally or uniformly distributed around rotor hub 414. Moreover, as shown in FIGS. 18 and 19, rotor blades 416 extend radially from central longitudinal axis 406. That is, each of rotor blade centerlines B1 to B8 are radial and pass through central longitudinal axis 406. However, rotor assembly 410 may include rotor blades 416 that are non-radial. When operated, rotor blades 416 rotate clockwise in the direction of arrow A (as viewed in FIG. 35).

Figure 37:
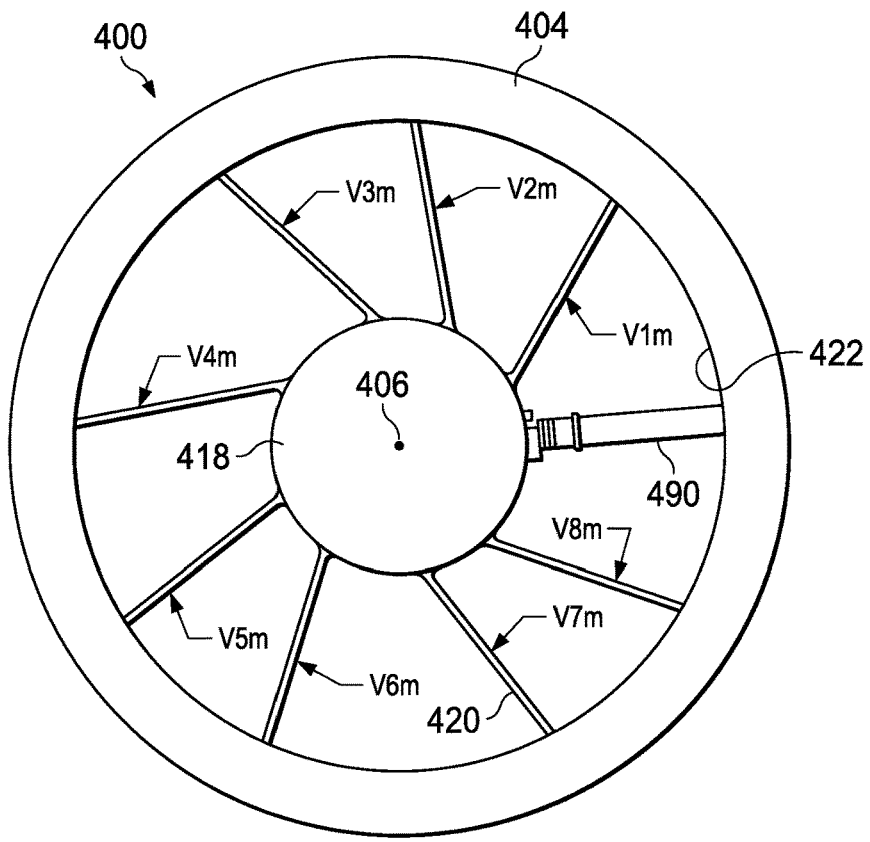
FIG. 37 is a rear view of a stator assembly of the thruster assembly of FIG. 35.

As shown in FIGS. 35 and 37, stator assembly 412 includes eight stator vanes 420, hence eight stator vane centerlines successively labeled as V1m to V8m. (The "m" indicates that stator vanes 420 are angularly modulated.) However, stator vanes 420 may include any other suitable number of stator vanes 420. A driveshaft 490 powering rotor assembly 410 extends from interior surface 422 of duct 404 to stator hub 418 between stator vanes V1m and V8m. Driveshaft 490 is drivingly engaged with rotor assembly 410 to operate the same.

Also shown in FIGS. 35 and 37, stator vanes 420 are modulated in the same direction about stator hub 418. Specifically, stator vanes 420 are inclined with respect to rotor blades 416 in the clockwise direction, in the direction of rotation A of rotor assembly 410. Thus, stator vane centerlines V1m to V8m are inclined relative to rotor blade centerlines B1 to B8, and a full stator vane centerline V1m-V8m will not overlap a full rotor blade centerline B1-B8 at any given time. Moreover, the modulation angle between adjacent stator vane centerlines V1m-V8m is varied or non-uniform. Additionally, stator vanes 420 are non-radial. As shown in FIG. 35, each of stator vane centerlines V1m-V8m passes through stator hub 418, but not through central longitudinal axis 406. Specifically, each stator vane centerline V1m-V8m is tangent to a respective circle having central longitudinal axis 406 as its axis. Thus, the modulation angles between stator vane centerlines V1m-V8m are continuously varied so that stator vane centerlines V1m-V8m do not have a radial configuration about central longitudinal axis 406 as do rotor blade centerlines B1-B8.

The modulation angles are a function of the circumferential position of each stator vane 420, which is a function of rotor blade 416 distribution. That is, the orientation of each stator vane 420 is based on rotor blade 416 distribution. To determine stator vane 420 modulation, a point is selected along each of rotor blade centerlines B1-B8. Thus, eight points are selected. The points are selected such that a line connecting the points forms an imaginary helix. This arrangement positions the eight points such that each of the eight points has a different radial length from central longitudinal axis 406. The positioning of the eight points may be determined in any suitable manner, e.g., mathematical modeling, experimenting, etc.

Then, an inclined line is passed through each of the points on rotor blade centerlines B1-B8. The lines are inclined in the same direction, i.e., in the direction of rotation A of rotor assembly 410. These lines define stator vane centerlines V1m-V8m of stator vanes 420. The intersection angles between stator vane centerlines V1m-V8m and respective rotor blade centerlines B1-B8 are equal. The angle is approximately 17 degrees. However, the angle may have any suitable and appropriate magnitude, and the magnitude may be determined in any suitable manner, e.g., mathematical modeling, experimenting, etc.

Thus, when rotor assembly 410 is operated, rotor blades 416 intersect with respective stator vanes 420 at about a 17-degree angle, but the point of intersection between each rotor blade 416 and respective stator vane 420 is at a different radial length from central longitudinal axis 406. By changing how each rotor blade 416 crosses a respective stator vane 420, the sound generated from the crossing is diversified and not symmetric. For example, the sound generated when B1 crosses V1m will be different from the sound generated when B2 crosses V2m, and the sound generated when B2 crosses V2m will be different from the sound generated when B3 crosses V3m. The range of sounds reduces the perceived noise generated by ducted thruster 400 during operation. The above modulation of rotor blades 416 can be accomplished with rotor blades 416 of any planform shape, including substantially rectangular and substantially nonrectangular, including tapered planforms and scimitar planforms.

However, since the rotor blade planform shapes in accordance with this disclosure are substantially nonrectangular, the same advantages described above using modulated stator vanes 420 can be accomplished with stators vanes 420 that are radial. That is, whereas stator vanes 420 of FIG. 35 do not extend from central longitudinal axis 406, stator vanes 420 of FIG. 36 do extend from central longitudinal axis and are radial stator vanes. Stator vanes 420 in FIG. 36 can be radial since the nonrectangular nature of rotor blades 416 achieves the same benefits outlined above. That is, the nonrectangular rotor blades 416 are designed and modulated so that no rotor blade 416 crosses over a stator vane 420 at the same point as another rotor blade 416 and no rotor blade 416 ever overlaps a full stator vane 420 due to the different shape of rotor blades 416 relative to stator vanes 420. Stator vanes 420 are labeled in FIG. 36 as $V1_R$-$V8_R$ (the subscript "R" identifying the stator vanes as radial). Substantially nonrectangular rotor blades 416 may be of various planform shapes, including scimitar planforms and tapered planforms. Also, the benefits identified above may be further achieved by using substantially non-rectangular rotor blade planforms and using unmodulated stator vanes 420 that have a constant spacing where stator vanes 420 are either radial or non-radial.

Some rotorcraft include a ducted anti-torque device transversely mounted in a tail section to control rotation of the rotorcraft about an axis of rotation of a main rotor mast. The following patents, relating to transversely-mounted ducted anti-torque devices, include additional features which may be incorporated into the embodiments divulged in this disclosure: U.S. Pat. No. 5,454,691, issued on Oct. 3, 1995; U.S. Pat. No. 5,498,129, issued on Mar. 12, 1996; U.S. Pat. No. 5,566,907, issued on Oct. 22, 1996; U.S. Pat. No. 5,588,618, issued on Dec. 31, 1996; U.S. Pat. No. 5,634,611, issued on Jun. 3, 1997; and U.S. Pat. No. 8,286,908, issued on Oct. 16, 2012; all of which are incorporated herein by reference in their entireties.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
   a fuselage having a front end, a tail end, and length therebetween, the fuselage being bisected by a vertical plane along the length of the fuselage;
   a first ducted fan having a first central longitudinal axis that is generally parallel to the vertical plane;
   a second ducted fan having a second central longitudinal axis that is generally parallel to the vertical plane;
   a first thruster assembly supported within the first ducted fan, comprising:
      a first rotor assembly rotatably coupled about the first central longitudinal axis within the first ducted fan, the first rotor assembly comprising:
         a first rotor hub; and
         a plurality of first rotor blades extending from the first rotor hub, the plurality of first rotor blades having a modulated angular distribution about the first central longitudinal axis;
      wherein the first rotor assembly is substantially balanced; and
      a first stator assembly coupled within the first ducted fan, the first stator assembly comprising:
         a first stator hub; and
         a plurality of first stator vanes extending from the first stator hub to an interior surface of the first ducted fan, the plurality of first stator vanes being angularly modulated around the first stator hub such that angular spacing between pairs of adjacent first stator vanes of the plurality of first stator vanes varies for each pair of the adjacent first stator vanes;

a second thruster assembly supported within the second ducted fan, comprising:
   a second rotor assembly rotatably coupled about the second central longitudinal axis within the second ducted fan, the second rotor assembly comprising:
      a second rotor hub; and
      a plurality of second rotor blades extending from the second rotor hub, the plurality of second rotor blades having a modulated angular distribution about the second central longitudinal axis;
   wherein the second rotor assembly is substantially balanced; and
   a second stator assembly coupled within the second ducted fan, the second stator assembly comprising:
      a second stator hub; and
      a plurality of second stator vanes extending from the second stator hub to an interior surface of the second ducted fan, the plurality of second stator vanes being angularly modulated around the second stator hub such that angular spacing between pairs of adjacent second stator vanes of the plurality of second stator vanes varies for each pair of the adjacent second stator vanes.

2. The aircraft of claim 1, wherein the modulated angular distribution of the plurality of first rotor blades and the plurality of second rotor blades are both defined by an equation:

$$\Theta_i' = \Theta_i + \Delta\Theta_i \sin(m\Theta_i)$$

wherein $\Theta_i'$ is a modulated blade angle for an ith rotor blade, $\Theta_i$ is a nominal blade angle for the ith rotor blade, $\Delta\Theta_i$ is a maximum modulation amplitude for a specific rotor blade of the plurality of first rotor blades or the plurality of second rotor blades, m is a modulation factor, and $\Delta\Theta_i$ is not a constant for the first rotor assembly or the second rotor assembly.

3. The aircraft of claim 1, wherein the plurality of first stator vanes are non-radial with respect to the first central longitudinal axis, and the plurality of second stator vanes are non-radial with respect to the second central longitudinal axis.

4. The aircraft of claim 2, wherein the modulation factor m=1 or 2.

5. The aircraft of claim 2, wherein $\Delta\Theta_i = \Delta\varphi/I$, and $\Delta\varphi$ is a phase-modulation amplitude and I is a number of rotor blades.

6. The aircraft of claim 1, wherein any angle between any two of the plurality of first rotor blades is different than any angle between any two of the plurality of first stator vanes, and any angle between any two of the plurality of second rotor blades is different than any angle between any two of the plurality of second stator vanes.

7. The aircraft of claim 1, wherein, when viewed along the first central longitudinal axis, each one of the plurality of first rotor blades intersects a respective one of the plurality of first stator vanes at an intersection point, each of the intersection points of the respective first rotor blades and first stator vanes having a different radial distance from the first central longitudinal axis, and each one of the plurality of second rotor blades intersects a respective one of the plurality of second stator vanes at an intersection point, each of the intersection points of the respective second rotor blades and second stator vanes having a different radial distance from the second central longitudinal axis.

8. The aircraft of claim 1, wherein the first ducted fan is rotatable about a first tilt axis that is generally perpendicular to the first central longitudinal axis, and the second ducted fan is rotatable about a second tilt axis that is generally perpendicular to the second central longitudinal axis.

9. An aircraft, comprising:
   a fuselage having a front end, a tail end, and length therebetween, the fuselage being bisected by a vertical plane along the length of the fuselage;
   a first duct having a first central longitudinal axis that is generally parallel to the vertical plane;
   a second duct having a second central longitudinal axis that is generally parallel to the vertical plane;
   a first thruster assembly supported within the first duct, comprising:
      a first rotor assembly rotatably coupled about the first central longitudinal axis within the first duct, the first rotor assembly comprising:
         a first rotor hub; and
         a plurality of first rotor blades extending from the first rotor hub, the plurality of first rotor blades having a modulated angular distribution about the first central longitudinal axis, each of the plurality of first rotor blades being configured to rotate about its own pitch-change axis, the pitch-change axes lying in a first rotor plane that is generally perpendicular to the first central longitudinal axis; and
      a first stator assembly coupled within the first duct, the first stator assembly comprising:
         a first stator hub; and
         a plurality of first stator vanes extending from the first stator hub to an interior surface of the first duct, the plurality of first stator vanes being inclined between 5 degrees and 25 degrees from a radial direction from the first stator hub to the interior surface of the first duct and being slanted between 1 degree and 6 degrees away from the first rotor plane from the first stator hub to the interior of the first duct;
   a second thruster assembly supported within the second duct, comprising:
      a second rotor assembly rotatably coupled about the second central longitudinal axis within the second duct, the second rotor assembly comprising:
         a second rotor hub; and
         a plurality of second rotor blades extending from the second rotor hub, the plurality of second rotor blades having a modulated angular distribution about the second central longitudinal axis, each of the plurality of second rotor blades being configured to rotate about its own pitch-change axis, the pitch-change axes lying in a second rotor plane that is generally perpendicular to the second central longitudinal axis; and
      a second stator assembly coupled within the second duct, the second stator assembly comprising:
         a second stator hub; and
         a plurality of second stator vanes extending from the second stator hub to an interior surface of the second duct, the plurality of second stator vanes being inclined between 5 degrees and 25 degrees from a radial direction from the second stator hub to the interior surface of the second duct and being slanted between 1 degree and 6 degrees away from the second rotor plane from the second stator hub to the interior of the second duct.

10. The aircraft of claim 9, wherein a leading edge of each of the plurality of first stator vanes is located between 1.5 to 2.5 times a chord length of the plurality of first rotor blades away from the first rotor plane, and a leading edge of each of the plurality of second stator vanes is located between 1.5 to 2.5 times a chord length of the plurality of second rotor blades away from the second rotor plane.

11. The aircraft of claim 10, wherein the first duct comprises:
a collector, corresponding to a portion of the interior surface of the first duct upstream of the first rotor plane, the collector comprising:
an inlet nozzle having an elliptical profile; and
a cylindrical portion extending from the inlet nozzle to the first rotor plane; and
a diffuser, corresponding to a portion of the interior surface of the first duct downstream of the first rotor plane, the diffuser comprising:
a cylindrical portion extending from the first rotor plane downstream; and
a frustoconical portion extending from the cylindrical portion of the diffuser downstream.

12. The aircraft of claim 11, wherein a length (L1) of the cylindrical portion of the collector is a function of the chord length (c) of the plurality of first rotor blades, a length (a) between a leading edge of the plurality of first rotor blades and their pitch-change axes, a maximum deformation of the plurality of first rotor blades (f), and a maximum positive pitch angle (βmax) of the plurality of first rotor blades, the function being: L1>(a)sin(βmax)+f, and wherein a length (L2) of the cylindrical portion of the diffuser being defined by a function: L2<(c−a)sin(βmax).

13. The aircraft of claim 11, wherein a length of the cylindrical portion of the collector is between 2% and 8% of a diameter of the cylindrical portion of the collector, a constant radius of the inlet nozzle is approximately 8% of the diameter of the cylindrical portion of the collector, a length of the cylindrical portion of the diffuser is between 1% and 3.5% of the diameter of the cylindrical portion of the collector, and a vertex half angle of the frustoconical portion is between 5 degrees and 20 degrees.

14. The aircraft of claim 13, further comprising an outlet having a radius between 1.6% and 4.3% of the diameter of the cylindrical portion of the collector.

15. The aircraft of claim 14, wherein the first duct is rotatable about a first tilt axis that is generally perpendicular to the first central longitudinal axis, and the second duct is rotatable about a second tilt axis that is generally perpendicular to the second central longitudinal axis.

16. An aircraft, comprising:
a fuselage having a front end, a tail end, and length therebetween, the fuselage being bisected by a vertical plane along the length of the fuselage;
a first duct having a first central longitudinal axis that is generally parallel to the vertical plane;
a second duct having a second central longitudinal axis that is generally parallel to the vertical plane;
a first thruster assembly supported within the first duct, comprising:
a first rotor assembly rotatably coupled about the first central longitudinal axis within the first duct, the first rotor assembly comprising:
a first rotor hub; and
a plurality of first rotor blades extending from the first rotor hub,
the plurality of first rotor blades having a modulated angular distribution about the first central longitudinal axis; and
a first stator assembly coupled within the first duct, the first stator assembly comprising:
a first stator hub; and
a plurality of first stator vanes extending from the first stator hub to an interior surface of the first duct, the plurality of first stator vanes being non-radial with respect to the first central longitudinal axis and being slanted away from the plurality of first rotor blades from the first stator hub to the interior of the first duct;
a second thruster assembly supported within the second duct, comprising:
a second rotor assembly rotatably coupled about the second central longitudinal axis within the second duct, the second rotor assembly comprising:
a second rotor hub; and
a plurality of second rotor blades extending from the second rotor hub, the plurality of second rotor blades having a modulated angular distribution about the second central longitudinal axis; and
a second stator assembly coupled within the second duct, the second stator assembly comprising:
a second stator hub; and
a plurality of second stator vanes extending from the second stator hub to an interior surface of the second duct, the plurality of second stator vanes being non-radial with respect to the second central longitudinal axis and being slanted away from the plurality of second rotor blades from the second stator hub to the interior of the second duct.

17. The aircraft of claim 16, wherein the plurality of first stator vanes have an aerodynamic profile of a NACA 65 type, with a relative thickness between 8% and 12%, a negative angle of attack relative to the first central longitudinal axis is between 2 degrees and 2.5 degrees, and a camber between 20 degrees and 28 degrees.

18. The aircraft of claim 17, wherein the plurality of first rotor blades have an aerodynamic profile of OAF type with a relative thickness decreasing between 14% and 9% along spans of the plurality of first rotor blades, and a twist decreasing from approximately 17 degrees to approximately 6.9 degrees or from approximately 7.25 degrees to approximately −1.2 degrees, between 40% and 100% of a radius of the first rotor assembly.

19. The aircraft of claim 18, wherein one of the plurality of first stator vanes is modulated in a first direction such that said one of the first stator vanes is slanted transverse to the first central longitudinal axis of the first duct and the remaining ones of the plurality of first stator vanes are modulated in a second direction that is opposite to the first direction.

20. The aircraft of claim 18, wherein the first duct is rotatable about a first tilt axis that is generally perpendicular to the first central longitudinal axis, and the second duct is rotatable about a second tilt axis that is generally perpendicular to the second central longitudinal axis.

* * * * *